United States Patent
Gjerde et al.

(10) Patent No.: US 6,265,168 B1
(45) Date of Patent: *Jul. 24, 2001

(54) APPARATUS AND METHOD FOR SEPARATING AND PURIFYING POLYNUCLEOTIDES

(75) Inventors: Douglas T. Gjerde, Saratoga, CA (US); Christopher P. Hanna, Somerville, MA (US); Paul D. Taylor, Palo Alto, CA (US); Benjamin L. Legendre, Jr., Belleview, NE (US); Robert M. Haefele, Palo Alto, CA (US)

(73) Assignee: Transgenomic, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/318,407

(22) Filed: May 25, 1999

Related U.S. Application Data

(60) Provisional application No. 60/130,700, filed on Apr. 23, 1999, provisional application No. 60/129,838, filed on Apr. 16, 1999, provisional application No. 60/123,301, filed on Mar. 3, 1999, provisional application No. 60/119,945, filed on Feb. 12, 1999, provisional application No. 60/117,178, filed on Jan. 25, 1999, provisional application No. 60/117,211, filed on Nov. 25, 1999, and provisional application No. 60/103,313, filed on Oct. 6, 1998.

(51) Int. Cl.[7] .............................. C12Q 1/68; C12P 19/34; C07H 21/00; C08B 5/02; B01D 15/08
(52) U.S. Cl. .............................. 435/6; 435/1.3; 435/91.2; 435/91.1; 536/25.4; 536/35.4; 536/25.32; 210/635
(58) Field of Search .............................. 435/1.3, 6, 91.2, 435/91.1; 536/25.4, 35.4, 25.32; 210/635

(56) References Cited

U.S. PATENT DOCUMENTS

| | | | |
|---|---|---|---|
| 4,906,378 | 3/1990 | Hagen et al. | 210/635 |
| 4,997,927 | 3/1991 | Blocker et al. | 536/27 |
| 5,098,539 | 3/1992 | Shieh | 204/182.8 |
| 5,203,992 | 4/1993 | Drouen | 210/198.2 |
| 5,338,448 | 8/1994 | Gjerde | 210/198.2 |
| 5,340,452 | 8/1994 | Brenner | 204/180.1 |
| 5,413,762 | 5/1995 | Hirano et al. | 422/70 |
| 5,437,979 | 8/1995 | Rampal | 435/6 |
| 5,443,734 | 8/1995 | Fetner | 210/656 |
| 5,508,204 | 4/1996 | Norman | 436/161 |
| 5,585,236 | 12/1996 | Bonn et al. | 435/5 |
| 5,616,701 | 4/1997 | Woodard et al. | 536/25.4 |
| 5,705,628 | 1/1998 | Hawkins | 536/25.4 |
| 5,783,686 | 7/1998 | Gonzales | 536/25.4 |
| 5,795,976 * | 8/1998 | Oefner et al. | 536/25.4 |
| 5,808,041 * | 9/1998 | Padhye et al. | 536/25.4 |
| 5,942,610 * | 8/1999 | Nelson et al. | 536/25.32 |
| 5,969,228 | 10/1999 | Gorstein | 73/23.22 |
| 5,997,742 * | 12/1999 | Gjerde et al. | 210/635 |
| 6,090,558 * | 7/2000 | Butler et al. | 435/6 |
| 6,120,985 * | 9/2000 | Laugharn, Jr. et al. | 435/1.3 |

FOREIGN PATENT DOCUMENTS

| | | | |
|---|---|---|---|
| 0 507 591 A2 | 10/1992 | (EP). | |
| 6-169754 | 6/1994 | (JP). | |
| 7-170981 | 7/1995 | (JP). | |
| 1759842 A1 | 9/1992 | (SU). | |
| 94/11305 | 5/1994 | (WO) | C02F/1/28 |
| 98/40395 | 9/1998 | (WO) | C07H/21/04 |
| 98/48913 | 11/1998 | (WO) | B01D/15/00 |
| 98/48914 | 11/1998 | (WO) | B01D/15/08 |
| 98/56797 | 12/1998 | (WO) | C07H/1/00 |
| 99/19514 | 4/1999 | (WO) | C12Q/1/68 |

OTHER PUBLICATIONS

Dizdaroglu et al., "Separation of small DNA and RNA oligonucleotides by high performance anion exchange liquid chromatography", Journal of Chromatography, vol. 171, pp. 321–330, Apr. 1979.*

All–Chrom Newsletter Metal Components, A Potential Source of Interference in HPLC Analysis, Alltech–Applied Science vol. 25, No. 1, pp. 1–6, Jun., 1986.

(List continued on next page.)

Primary Examiner—W. Gary Jones
Assistant Examiner—Arun Kr. Chakrabarti
(74) Attorney, Agent, or Firm—William B. Walker

(57) ABSTRACT

A method for removing a target DNA fragment having a predetermined base-pair length from a mixture of DNA fragments comprises the following steps. A mixture of DNA fragments which may contain the target DNA fragments is applied to a separation column containing media having a nonpolar, nonporous surface, the mixture of DNA fragments being in a first solvent mixture containing a counterion and a DNA binding concentration of driving solvent in a cosolvent. The target DNA fragments are separated from the media by contacting it with a second solvent solution containing a counterion and a concentration of driving solvent in cosolvent which has been predetermined to remove DNA fragments having the target DNA fragment base pair length from the media. The target DNA fragments can be collected and optionally amplified. When the method is being applied to collect a putative fragment, if present, no DNA fragments having the base pair length of the target DNA could be present in the mixture. Alternatively, DNA fragments having the base pair length of the target DNA are present in the mixture. The disclosure also describes an ambient or low pressure device for separating polynucleotide fragments from a mixture of polynucleotide fragments comprises a tube having an upper solution input chamber, a lower eluant receiving chamber, and a fixed unit of separation media supported therein. The separation media has nonpolar separation surfaces which are free from multivalent cations which would react with counterion to form an insoluble polar coating on the surface of the separation media.

49 Claims, 16 Drawing Sheets

OTHER PUBLICATIONS

Coenen et al. Optimization of the Separation of the PR and SP Diasteromers of Phsphate–Methylated DNA and RNA Dinuleotides, Journal of Chromatography, 596, 59–66, (1992).

DNA Cleanup and Gel Extraction, Qiagen Product Guide, pp. 169–176, 1999.

Drager et al. High–Performance Anion–Exchange Chromatography of Oligonucleotides, Analytical Biochemistry, 145, 47–56 (1985).

Edge Biosystems, Research Products Handbook, p. 4, 1999–2000.

Puresyn, Inc. Communique Physical Characteristics of the Polyflo Resin.

Fritz et al. High–Performance Liquid Chromatography in Polynucleotide Synthesis, Biochemistry, 17, 7, pp. 1257–1267, (1978).

Furst et al. Simultaneous Determination of Myocardial Nucleotides, Nucleosides, Purine Base and Creatine Phosphate By Ion–Pair High–Performance Liquid Chrmatography, J. Chromatography, 578, 39–44, Jul. 1, 1992.

Green et al. HPLC Purification of synthetic Oligodeoxyribonucleotides Contatining Base– and Backbone–Modified Sequences, BioTechniques 19:5, pp. 836–841 (Nov. 1993).

Green et al. Preparative Purification F Sypercoiled Plasmid DNA for Therapeutic Applications, BioPharm, 10:5 pp. 52–62, May 1997.

Heftman, Chromatography, 5th Edition, Journalof Chromatography Library—vol. 51A, Elsevier, pp. A299–A300, 1992.

Huang et al.Large–Scale Purification of Synthetic Ologonucleotides and Carcinogen–Modified Oligodeoxynucleotides on a Revers–Phase Polystyrene (PRP–1) Column, Analytical Biochemistry, 190, 21–25, 1990.

Ip et al. Separation O Nucleosides and Nucleotides by Reversed–Phase HPLC with Volatile Buffers Allowing Sample Recovery, Analytical Biochemistry, 147, 180–185 (1985).

Kwiatkowski et al. Use of RP Ion Pair Chromatography to Fractionate and Purify DNA Fragments and Monomeric Components of RNA, Acta Chemica scandinavica B. 38, 9, 721–733, (1984).

Moriyama et al., New RP HPLC Column for Oligonucleotide Separation, Journal of Chromatography, 445, 225–233, (1988).

Nucleic Acid Purification and Labeling, Promega Life Science Catalog, p. 9.10, 1999.

Schmitter et al. Rapid Purification of DNA Fragments by High–Performance Size–Exclusion Chromatography, J of Chrom. (1986) 378: 462–466.

Stratagene Catalog, pp. 114–115, 1999.

Tashlitskii et al. Optimization of Conditions for Ion–Pair HPLC of Oligonucleotides Bioorg. Khim., 23 (9), 732–741 (1997) Biosis Abstract No. 01070821.

Vtorushna et al. Study of Diastereomers of Non–Ionic Oligonucleotide Analogues. VI. Separtion of Diastereomers of Ethyl Phosphotriesters O Octanucleotide d(GC-CAAACA) by Means of HP Complentary Chromatography, Bioorg. Khim. 18, 1, 92–99 (1992).

Zon et al. Purification of Synthetic Oligodeoxyribonucleotides, Chapter 14 in High Performance Liquid Chromatography in Biotechnology, Hancock, (ed.) John Wiley & Sons, New York, NY, 1990, pp. 301–398.

Arnold, et al. A Highly Sensitive, Fast, and Economical Technique for Mutation Analysis in Hereditary Breast and Ovarian Cancers, Human Mutation, 14:333–339, (1999).

Belenky et al. High–Throughput Biopolymer Desalting Prior to Mass Spectrometry Using 96–Well Solid–Phase Extraction Plates, Abstract No. P9, DNA 2000 International Symposium, Jun. 1–3, 2000, Boston, Mass.

Braman et al. Simple Purification of DNA From Plasmid Minipreps, PCR Amplifications and Agarose Gels, Stratagies 10:84–86 (1999).

Brossette et al. A Program for Selecting DNA Fragments to Detect Mutations by Denaturing Gel Electrophoresis Methods, Nucleic Acids Res., 22:4321–4325, (1994).

Gioradano et al. Identification by Denaturing High–Perfromance Liquid Chromatography of Numerous Polymorphisms in a Candidate Region for Multiple Scelerosis Susceptibility, Genomics, 56:247–253, (1999).

Gross et al. A Comparision of BRCA1 Mutation Analysis by Direct Sequencing, SSCP and DHPLC, Hum. Genet., 105:72–78, (1999).

Huber et al. High–Resolution Liquid Chromatography of DNA Fragments on Non–Porous Poly (Styrene–Divinylbenzene Particles), Nucleic Acids Research, vol. 21, No. 5, 1061–1066, 1993.

Huber et al. High–Resolution Liquid Chromatography of Oligonucleotides on Nonporous Alkylated Styrene–Divinylbenzene Copolymers, Analytical Biochemistry, 212, 351–358, (1993).

Huber , Christian High–Performance Liquid Chromatographic Separation of Detritylated Oligonucleotides on Highly Cross–Linked Poly (Styrene–Divinylbenzene) Particles, Journal of Chromatography, 599, 113–118, (1992).

Jones et al. Optimal Temperature Selection for Mutation Detection by Denaturing HPLC and Comparison to Single–Stranded Conformation Polymorphism and Heteroduplex Analysis, Clinical Chem., 45–48, 1999.

Oefner et al. High–Resolution Liquid Chromatography of Fluorescent Dye–Labeled Nucleic Acids, Analytical Biochemistry, 223, 001–008, (1994).

Oefner, et al. High–Resolution Liquid Chromatography of Nucleic Acids, American Laboratory, 28C–28J (1994).

Oefner et al. DNA Mutation Detection Using Denaturing High–Performance Liquid Chromatography (DHPLC), Current Protocols in Human Genetics, 7.10.1–7.10.12, 1998.

Marlowe et al. A Method for Detection and Quantitation of PcR Template in Environmental Samples by High Performance Liquid Chromatography, Journal of Microbiological Methods, 28 (1997) 45–53.

Sauer et al. Fast and Efficient Enzyme Removal With QIAquick™ Spin Kits, Qiagen News 5:13–15 (1998).

Millipore Corporation, Data Sheet—ZipTip™ Pipette Tips for Sample Preparation, http//:www.millipore.com (Aug. 1, 2000).

Millipore Corporation, Protocol–Sample Preparation of Oligonucleotides Prior to Maldi–TOF MS Using ZipTip C18 and ZipTip μ–C18 Pipettes Tips, http//:www.millipore.com/analytical/pubdbase.nsflTN225.html(Aug. 1, 2000).

Kuklin et al, A Novel Technique for Rapid Automated Genotyping of DNA Polymorphisms in the Mouse, Molecular and Cellular Probes, vol. 13, No. 3, (Jun. 1999) pp. 239–242.

Myers et al, Modification of the melting Properties of Duplex DNA by Attachment of a GC–Rich DNA Sequence as Determined by Denaturing Gradient Gel Electrophoresis, Nucleic Acids Research, GB, Oxford, University Press, Surrey, vol. 13, No. 9 (1985) pp.,. 3111–3129.

Gelfi et al, Detection of Point Mutations by Capillary Electrophoresis in Liquid Polymers in Temporal Thermal Gradients, Electrophoresis, vol. 15, No. 12, (Dec. 1, 1994) pp. 1506–1511.

Huber et al, Rapid and Accurate Sizing of DNA Fragments by Ion–Pair Chromatography on Alkylated Nonporous Poly-(Styrene–Divinylbenzene) Particles, Analytical Chemistry, US, American Chemical Society. Columbus, vol. 67, (Feb. 1, 1995), pp. 578–585.

* cited by examiner

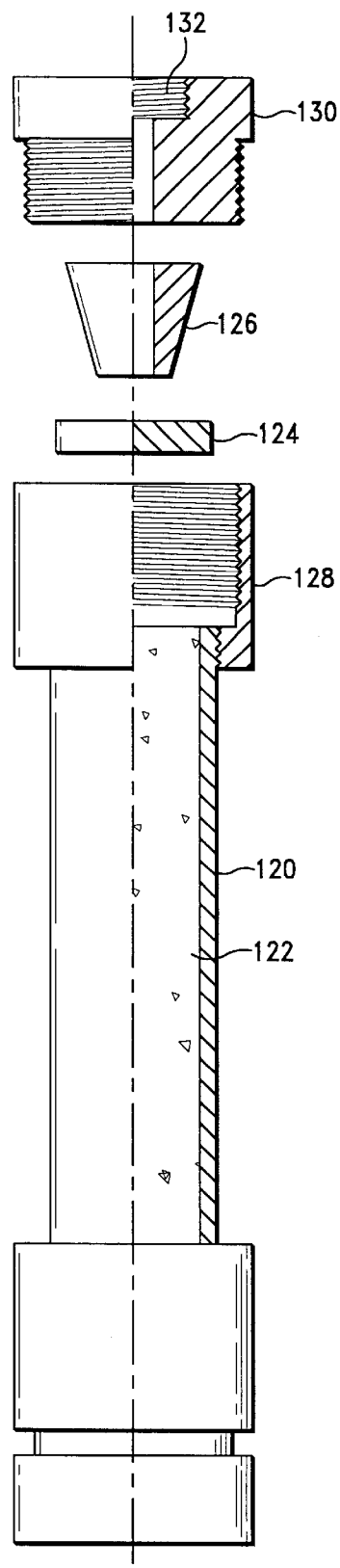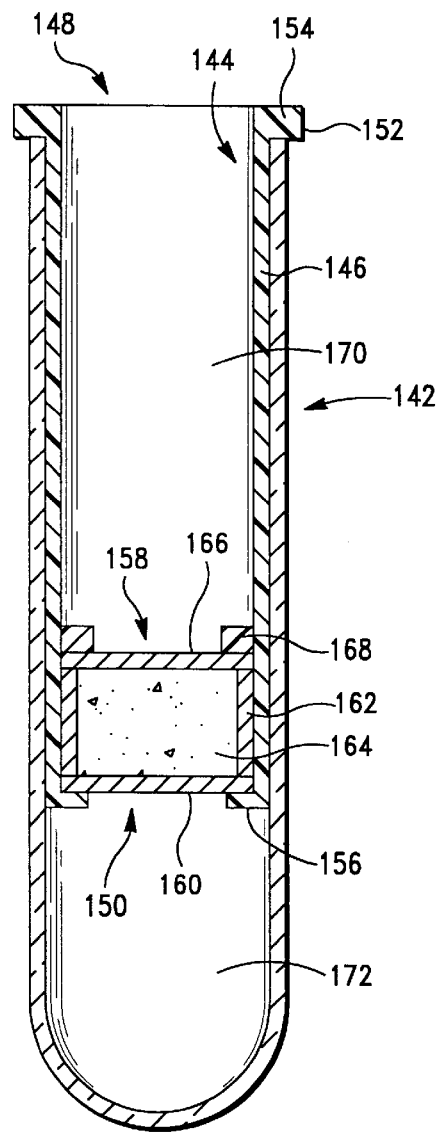
FIG.-3
FIG.-7

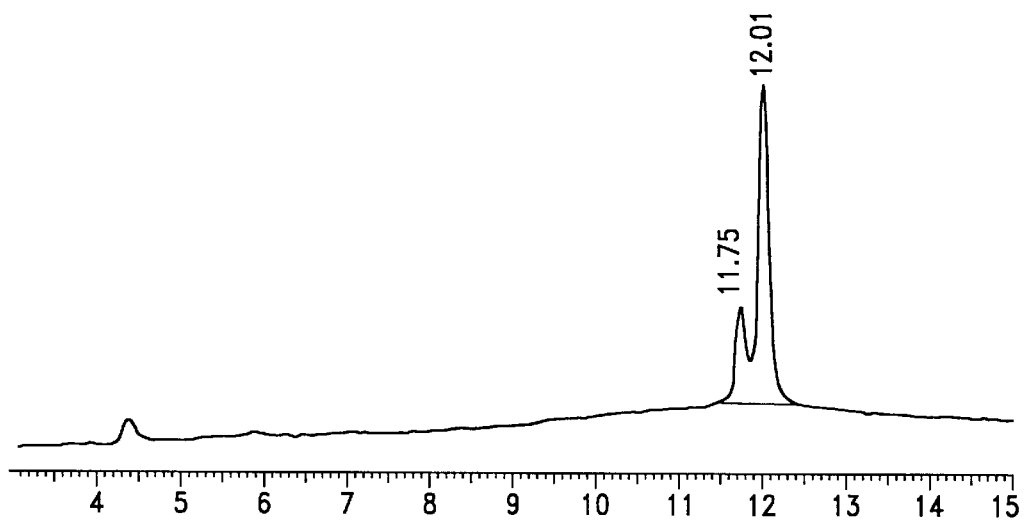
FIG.—20
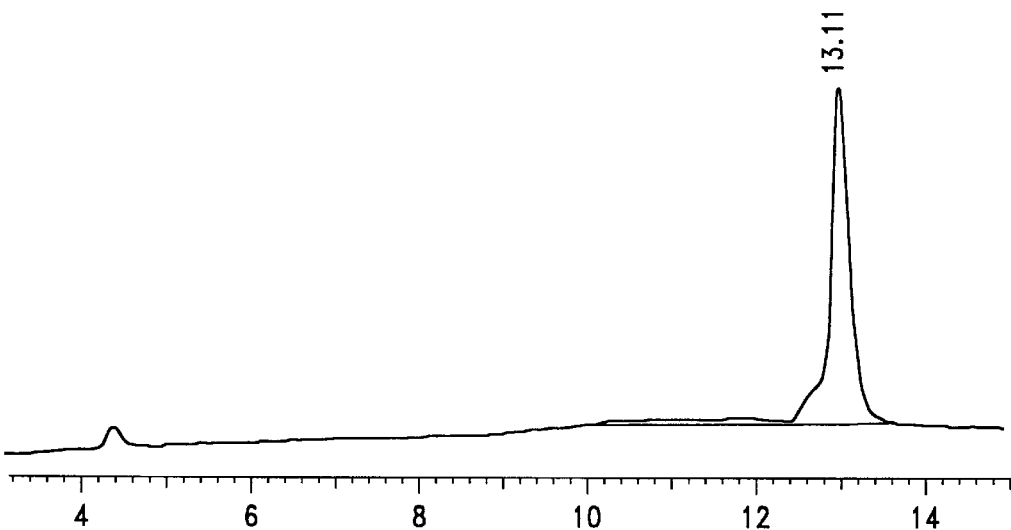
FIG.—21

FIG.—30

APPARATUS AND METHOD FOR SEPARATING AND PURIFYING POLYNUCLEOTIDES

RELATIONSHIP TO COPENDING APPLICATIONS

This application is a regular U.S. patent application under 35 U.S.C. §111 (a) and 35 U.S.C. §1.53(b) and claims priority from the following co-pending, commonly assigned U.S. Provisional Applications, each filed under 35 U.S.C. §111 (b):

Ser. No. 60/103,313, filed Oct. 6, 1998;
Ser. No. 60/117,211 filed Jan. 25, 1999;
Ser. No. 60/117,178 filed Jan. 25, 1999;
Ser. No. 60/119,945 filed Feb. 12, 1999;
Ser. No. 60/123,301 filed Mar. 3, 1999;
Ser. No. 60/129,838 filed Apr. 16, 1999;
Ser. No. 60/130,700 filed Apr. 23, 1999; and the following co-pending commonly assigned non-provisional U.S. patent applications, each filed under 53 U.S.C. §111:

Ser. No. 09/039,061 filed Mar. 13, 1998 (pending);
Ser. No. 09/058,337 filed Apr. 10, 1998 (abandoned);
Ser. No. 09/058,580 filed Apr. 10, 1998 (abandoned);
Ser. No. 09/081,039 filed May 18, 1998 (now U.S. Pat. No. 5,972,222);
Ser. No. 09/129,105 filed Aug. 4, 1998 (now U.S. Pat. No. 6,024,878);
Ser. No. 09/183,047 filed Oct. 30, 1998 (now U.S. Pat. No. 6,066,258);
Ser. No. 09/183,123 filed Oct. 30, 1998 (now U.S. Pat. No. 6,056,877);
Ser. No. 09/183,450 filed Oct. 30, 1998 (now U.S. Pat. No. 5,997,742);
Ser. No. 09/183,573 filed Oct. 30, 1998 (abandoned); and
Ser. No. 09/311,116 filed May 13, 1999.

The entire contents of the above-listed pending patent applications are hereby incorporated by reference.

FIELD OF THE INVENTION

This invention relates to an apparatus and method for separating, isolating, and purifying polynucleotides. In particular, this invention relates to methods and devices for separating targeted polynucleotide fragments having a predetermined base-pair length or range of base pair lengths, and for separating and purifying polynucleotides with both high pressure and low pressure devices.

BACKGROUND OF THE INVENTION

A need exists for rapid and efficient procedures for isolating, separating and purifying single-stranded oligonucleotides and single-stranded DNA fragments, RNA single-stranded DNA fragments, plasmids and the like. Traditional methods such as ion exchange chromatography, high pressure reverse phase chromatography, gel electrophoresis, capillary electrophoresis and the like are slow, laborious and inefficient, and they require the services of a highly skilled chromatographic expert. Furthermore, many methods are incapable of effecting a base-pair length size based separation of these fragments and are capable of yielding only minute quantities of separated materials.

Mixtures of single-stranded nucleic acid fragments having different base pair lengths are separated for numerous and diverse reasons. The ability to detect mutations in single-stranded polynucleotides, and especially in DNA fragments which have been amplified by PCR, presents a somewhat different problem since DNA fragments containing mutations are generally the same length as their corresponding wild type (defined herein below) but differ in base sequence.

DNA separation and mutation detection are of great importance in medicine, as well as in the physical and social sciences, as well as in forensic investigations. The Human Genome Project is providing an enormous amount of genetic information which is setting new criteria for evaluating the links between mutations and human disorders (Guyer, et al., *Proc. Natl. Acad. Sci. USA* 92:10841 (1995)). The ultimate source of disease, for example, is described by genetic code that differs from wild type (Cotton, *TIG* 13:43 (1997)). Understanding the genetic basis of disease can be the starting point or a cure. Similarly, determination of differences in genetic code can provide powerful and perhaps definitive insights into the study of evolution and populations (Cooper, et. al., *Human Genetics* 69:201 (1985)). Understanding these and other issues related to genetic coding is based on the ability to identify anomalies, i.e., mutations, in a DNA fragment relative to the wild type. A need exists, therefore, for a methodology which can separate DNA fragments based on size differences as well as separate DNA having the same length but differing in base pair sequence (mutations from wild type), in an accurate, reproducible, reliable manner. Ideally, such a method would be efficient and could be adapted to routine high throughput sample screening applications.

DNA molecules are polymers comprising sub-units called deoxynucleotides. The four deoxynucleotides found in DNA comprise a common cyclic sugar, deoxyribose, which is covalently bonded to any of the four bases, adenine (a purine), guanine (a purine), cytosine (a pyrimidine), and thymine (a pyrimidine), hereinbelow referred to as A, G, C, and T respectively. A phosphate group links a 3'-hydroxyl of one deoxynucleotide with the 5'-hydroxyl of another deoxynucleotide to form a polymeric chain. In single-stranded DNA, two strands are held together in a helical structure by hydrogen bonds between, what are called, complimentary bases. The complimentarity of bases is determined by their chemical structures. In single-stranded DNA, each A pairs with a T and each G pairs with a C, i.e., a purine pairs with a pyrimidine. Ideally, DNA is replicated in exact copies by DNA polymerases during cell division in the human body or in other living organisms. DNA strands can also be replicated in vitro by means of the Polymerase Chain Reaction (PCR).

Sometimes, exact replication fails and an incorrect base pairing occurs, which after further replication of the new strand, results in single-stranded DNA offspring containing a heritable difference in the base sequence from that of the parent. Such heritable changes in base pair sequence are called mutations.

In the present invention, single-stranded DNA is referred to as a duplex. When a base sequence of one strand is entirely complimentary to a base sequence of the other strand, the duplex is called a homoduplex. When a duplex contains at least one base pair which is not complimentary, the duplex is called a heteroduplex. A heteroduplex is formed during DNA replication when an error is made by a DNA polymerase enzyme and a non-complimentary base is added to a polynucleotide chain being replicated. Further replications of a heteroduplex will, ideally, produce homoduplexes which are heterozygous, i.e., these homoduplexes will have an altered sequence compared to the original parent DNA strand. When the parent DNA has a sequence which predominates in a naturally occurring population, it is generally called "wild type".

Many different types of DNA mutations are known. Examples of DNA mutations include, but are not limited to, "point mutation" or "single base pair mutations" wherein an incorrect base pairing occurs. The most common point mutations comprise "transitions" wherein one purine or pyrimidine base is replaced for another and "transversions" wherein a purine is substituted for a pyrimidine (and visa versa). Point mutations also comprise mutations wherein a base is added or deleted from a DNA chain. Such "insertions" or "deletions" are also known as "frameshift mutations". Although they occur with less frequency than point mutations, larger mutations affecting multiple base pairs can also occur and may be important. A more detailed discussion of mutations can be found in U.S. Pat. No. 5,459,039 to Modrich (1995), and U.S. Pat. No. 5,698,400 to Cotton (1997). These references and the references contained therein are incorporated in their entireties herein.

The sequence of base pairs in DNA code for the production of proteins. In particular, a DNA sequence in the exon portion of a DNA chain codes for the corresponding amino acid sequence in a protein. Therefore, a mutation in DNA sequence may result in an alteration in the amino acid sequence of a protein. Such an alteration in the amino acid sequence may be completely benign or may inactivate a protein or alter its function to be life threatening or fatal. On the other hand, mutations in an intron portion of a DNA chain would not be expected to have a biological effect since an intron section does not contain code for protein production. Nevertheless, mutation detection in an intron section may be important, for example, in a forensic investigation.

Detection of mutations is, therefore, of great interest and importance in diagnosing diseases, understanding the origins of disease and the development of potential treatments. Detection of mutations and identification of similarities or differences in DNA samples is also of critical importance in increasing the world food supply by developing diseases resistant and/or higher yielding crop strains, in forensic science, in the study of evolution and populations, and in scientific research in general (Guyer, et al., *Proc. Natl. Acad. Sci. USA* 92:10841 (1995); Cotton, *TIG* 13:43 (1997)).

Alterations in a DNA sequence which are benign or have no negative consequences are sometimes called "polymorphisms". In the present invention, any alterations in the DNA sequence, whether they have negative consequences or not, are denoted as "mutations". It is to be understood that the method and system of this invention have the capability to detect mutations regardless of biological effect or lack thereof. For the sake of simplicity, the term "mutation" will be used throughout to mean an alteration in the base sequence of a DNA strand compared to a reference strand (generally, but not necessarily, wild type). It is to be understood that in the context of this invention, the term "mutation" includes the term "polymorphism" or any other similar or equivalent term of art.

A need exists for an accurate and reproducible analytical method for mutation detection which is easy to implement. Ideally, the method would be automated and provide high throughput sample screening with a minimum of operator attention, is also highly desirable.

Prior to this invention, size-based analysis of DNA samples relied upon separation by gel electrophoresis (GEP). Capillary gel electrophoresis (CGE) has also been used to separate and analyze mixtures of DNA fragments having different lengths, e.g., the different lengths resulting from restriction enzyme cleavage. However, these methods cannot distinguish DNA fragments which differ in base sequence, but have the same base pair length. Therefore, gel electrophoresis cannot be used directly for mutation detection. This is a serious limitation of GEP.

Gel-based analytical methods, such as denaturing gradient gel electrophoresis (DGGE) and denaturing gradient gel capillary electrophoresis (DGGC), can detect mutations in heteroduplex DNA strands under "partially denaturing" conditions. The phenomenon of "partial denaturation" is well known in the art and occurs because a heteroduplex will denature at the site of base pair mismatch at a lower temperature than is required to denature the remainder of the strand. However, these gel-based techniques are operationally difficult to implement and require highly skilled personnel. In addition, the analyses are lengthy and require a great deal of set up time. A denaturing capillary gel electrophoresis analysis is limited to relatively small fragments. Separation of a 90 base pair fragment takes more than 30 minutes. A gradient denaturing gel runs overnight and requires about a day of set up time. Additional deficiencies of gradient gels are the isolation of separated DNA fragments (which requires specialized techniques and equipment) and analysis conditions must be experimentally developed for each fragment (Laboratory Methods for the Detection of Mutations and Polymorphisms, ed. G. R. Taylor, CRC Press, 1997). The long analysis time of the gel methodology is further exacerbated by the fact that the movement of DNA fragments in a gel is inversely proportional, in a geometric relationship, to their length. Therefore, the analysis time of longer DNA fragments can be often be untenable.

Recently, an HPLC based ion pairing chromatographic method was introduced to effectively separate mixtures of single-stranded polynucleotides, in general and DNA, in particular, wherein the separations are based on base pair length. This method is described in the following references which are incorporated herein in their entireties: U.S. Pat. No. 5,795,976 (1998) to Oefner; U.S. Pat. No. 5,585,236 (1996) to Bonn; Huber, et al., *Chromatographia* 37:653 (1993); Huber, et al., *Anal. Biochem.* 212:351 (1993).

As the use and understanding of HPLC developed it became apparent that when HPLC analyses were carried out at a partially denaturing temperature, i.e., a temperature sufficient to denature a heteroduplex at the site of base pair mismatch, homoduplexes could be separated from heteroduplexes having the same base pair length (Hayward-Lester, et al., *Genome Research* 5:494 (1995); Underhill, et al., *Proc. Natl. Acad. Sci. USA* 93:193 (1996); Doris, et al., *DHPLC Workshop*, Stanford University, (1997)). These references and the references contained therein are incorporated herein in their entireties. Thus, the use of Denaturing HPLC (DHPLC) was applied to mutation detection (Underhill, et al., *Genome Research* 7:996 (1997); Liu, et al., *Nucleic Acid Res.*, 26;1396 (1998)).

DHPLC can separate heteroduplexes that differ by as little as one base pair. However, in certain cases, separations of homoduplexes and heteroduplexes are poorly resolved. Artifacts and impurities can interfere with the interpretation of DHPLC separation chromatograms in the sense that it may be difficult to distinguish between an artifact or impurity and a putative mutation (Underhill, et al., *Genome Res.* 7:996 (1997)). The presence of mutations may even be missed entirely (Liu, et al., *Nucleic Acid Res.* 26:1396 (1998)). The references cited above and the references contained therein are incorporated in their entireties herein.

The accuracy, reproducibility, convenience and speed of DNA fragment separations and mutation detection assays based on HPLC have been compromised in the past because of HPLC system related problems. This invention addresses these problems and applies the term "Matched Ion Polynucleotide Chromatography" (MIPC) to the separation method and system which is used in connection with the present invention. When used under partially denaturing conditions, MIPC is defined herein as Denaturing Matched Ion Polynucleotide Chromatography (DMIPC).

MIPC systems (WAVE® DNA Fragment Analysis System, Transgenomic, Inc. San Jose, Calif.) are equipped with computer controlled ovens which enclose the columns and column inlet areas. Non-limiting examples of key distinguishing features of MIPC include the a) use of hardware having liquid contacting surfaces which do not release multivalent cations therefrom, b) protection of liquid contacting surfaces from exogenous multivalent cations by means cartridges containing multivalent cation capture resins, c) the use of a special washing protocol for MIPC separation media, d) automated selection of an optimum solvent gradient solvent gradient for elution of a specific base length DNA fragment, and e) automated determination of the temperature required to effect partial denaturation of a heteroduplex when MIPC is used under partially denaturing conditions (DMIPC) for mutation detection.

The present invention can be used in the separation of RNA or of double- or single-stranded DNA. For purposes of simplifying the description of the invention, and not by way of limitation, the separation of double-stranded DNA will be described in the examples herein, it being understood that all polynucleotides are intended to be included within the scope of this invention. The invention applies to size-dependent separations and denaturing separations by MIPC. Both these separations can include separations of DNA fragments having nonpolar tags.

Important aspects of DNA separation and mutation detection by HPLC and DHPLC which have not been heretofore addressed, comprise a) the treatment of, and materials comprising chromatography system components, b) the treatment of, and materials comprising separation media, c) solvent pre-selection to minimize methods development time, d) optimum temperature pre-selection to effect partial denaturation of a heteroduplex during HPLC and e) optimization of DHPLC for automated high throughput mutation detection screening assays. These factors, which comprise MIPC/DMIPC but not HPLC/DHPLC, are essential when using chromatographic methods in order to achieve unambiguous, accurate, reproducible and high throughput DNA separations and mutation detection results. A comprehensive description of MIPC systems and separation media, including the critical importance of maintaining an environment which is free of multivalent cations, is presented in U.S. Pat. No. 5,772,889 (1998) to Gjerde and U.S. patent applications Ser. No. 09/129,105 filed Aug. 4, 1998; Ser. No. 09/081,040 filed May 18, 1998 (now U.S. Pat. No. 6,017,457); Ser. No. 09/080,547 filed May 18, 1998; Ser. No. 09/058,580 filed Apr. 10, 1998; Ser. No. 09/058,337 filed Apr. 10, 1998; Ser. No. 09/065,913 filed Apr. 24, 1998 (now U.S. Pat. No. 5,986,085; Ser. No. 09/039,061 filed Mar. 13, 1998; Ser. No. 09/081,039 filed May 18, 1998. These references and the references contained therein are incorporated in their entireties herein.

All of the liquid chromatographic separations discussed herein above comprise gradient elution, i.e., they utilize a multi-component mobile phase wherein the concentration of the driving component, usually an organic solvent, is increased during the course of the chromatography. This approach reduces the time required to complete an analysis. However, the separation of mixture components can be compromised. Efforts have been made to improve the resolving power of MIPC. These efforts have centered on improving the gradient process, changing the column particle size, or changing the column length. However, only small improvements have been achieved with these efforts. Therefore, there exists a need improve the separation of poorly resolved or close running components. Such improvement is especially useful when it is important to isolate a component in pure form, as for example, for PCR amplification, sequencing, mutation detection, and numerous other applications.

Many tasks within molecular biology require prior purification of nucleic acids. Current strategies involve the use of gel electrophoresis or solid-phase extraction (typically on silica gel or an anion exchange resin). While these procedures lead to overall improvements in nucleic acid purity relative to original unpurified materials, they suffer from negative characteristics. See Hecker, Karl et al, "Optimization of cloning efficacy by pre-cloning DNA Fragment Analysis", *Biotechniques*, 26:216–222 February, 1999 which shows the limitations of the prior art separation methods and the superior purity obtained with the methods of this invention. Gel electrophoresis suffers from a lack of automation, incomplete separation of distinct fragments, as well as incomplete recovery of fragments. While solid-phase extraction procedures lend themselves to automation, they also can suffer from incomplete separation of distinct fragments and from incomplete recovery of fragments.

Many procedures for investigating or evaluating genetic materials require enzymatic cleavage of the materials and isolating a particular DNA fragment or range of DNA fragments from the DNA fragment mixture produced by the cleavage. These isolations are particularly important in the early diagnosis of certain diseases, especially cancer. In the case of cancer and other diseases of genetic origin, early detection often depends on the availability of an appropriate analytical method which can accurately and reliably detect a mutation in DNA samples.

As described in copending Sklar et al U.S. patent application Attorney Docket No. P-217 filed May 13, 1999, this problem is exacerbated by the fact that such samples may contain a very small population of cells containing mutant DNA in the presence of a very large predominantly normal cell population containing, for example, wild type DNA. Before the development of this invention, any separation techniques which were theoretically capable of detecting mutant DNA in the presence of wild type would fail because the concentration of mutant DNA was simply too low to be detected relative to wild type. That is to say, the concentration of mutant DNA may be too low to detect in absolute terms. Alternatively, the concentration of mutant DNA may be sufficient to detect, but will be completely obscured because of the very large relative amount of wild type in the sample.

Increasing the amount of mutant DNA by PCR amplification of the sample would not solve the problem described above. The mutant and wild type DNA in the sample are very similar. In fact, their sequence may differ by only a single base pair. Therefore, the primers used to amplify the mutant DNA would also amplify the wild type since both are present in the sample. As a result, the relative amounts of mutant and wild type DNA would not change.

For example as described in the copending Sklar et al application (supra), following radiation or chemotherapy, cancer patients are monitored for the presence of residual cancer cells to determine whether the patients are in remission. The effectiveness of these treatments can be monitored if small levels of residual cancer cells could be detected in a predominantly large wild type population. Traditionally, the remission status is assessed by a pathologist who conducts histological examination of tissues samples. However, these visual methods are largely qualitative, time-consuming, and costly. At best, the sensitivity of these methods permits detection of about 1 cancerous cell in 100 cells.

Analysis of DNA samples has historically been done using gel electrophoresis. Capillary electrophoresis has also been used to separate and analyze mixtures of DNA. However, these methods cannot distinguish point mutations from homoduplexes having the same base pair length.

In addition to the deficiencies of denaturing gel methods mentioned above, these techniques are not always reproducible or accurate since the preparation of a gel slab and running an analysis can be highly variable from one operator to another. As a result, the mobility of a DNA fragment is different on different gel slabs and even in one lane, compared to another on the same gel slab. The problems and deficiencies of gel-based DNA separation methods are well known in the art and are described in the published literature, e.g., G. R. Taylor, editor, LABORATORY METHODS FOR THE DETECTION OF MUTATIONS AND POLYMORPHISMS, CRC Press (1997).

SUMMARY AND OBJECTS OF THE INVENTION

It is an object of this invention to provide a method and apparatus for rapid and efficient base-pair length size separation of double-stranded DNA (dsDNA) and for effecting size-based separation of single-stranded oligonucleotides and single-stranded DNA fragments, RNA, plasmids and the like.

It is a further object of this invention to provide a simple and inexpensive method and apparatus for size-based separation of these fragments, which can be easily and reproducibly operated by a trained technician.

It is a still further object of this invention to provide a method and devices for low pressure separation of these fragments.

It is another object of this present invention to provide a sensitive and reproducible method enabling the isolation of small amounts of any target DNA in a mixture of DNA fragments.

It is a still further object of this invention to provide a method and system which is suitable for isolating a mutant DNA in the presence of a relatively large amount of wild type DNA, wherein such mutations would otherwise go undetected.

It is a principal object of this invention to provide an analytical method which is reproducible, reliable, inexpensive, can be automated and can be used for high throughput sample screening.

In summary, a method of this invention for isolating targeted DNA fragments having a predetermined base-pair length from a mixture of DNA fragments comprises the following steps. The mixture of DNA fragments is applied to a separation column containing separation media having a nonpolar, nonporous surface, the mixture of DNA fragments being in a first solution containing counterion and a DNA binding concentration of driving solvent. Targeted DNA fragments are removed from the media by contacting the media with a second solution containing counterion and a concentration of driving solvent which has been predetermined to remove DNA fragments having the targeted fragments from the separation media into a distinct segment of eluant.

Optionally, the targeted DNA fragments are recovered. The recovered targeted DNA fragments can be amplified and cloned.

The method can be applied to determine the presence or absence of DNA fragments having a specific base-pair length in the sample mixture. The method can be applied when the DNA fragments having said base pair length are present in the sample mixture in a concentration which is too low to be detected in the analysis, and the amplified product is analyzed to verify the presence of DNA fragments having said base pair length in the sample mixture.

Another method of this invention is a procedure separating by DMIPC target homoduplex and/or heteroduplex DNA fragments from a mixture of homoduplex and heteroduplex DNA fragments having the same base-pair length, the heteroduplex fragments having at least one mismatch site. The method comprises the following steps: The mixture of homoduplex and heteroduplex DNA fragments is applied to a separation column containing separation media having a nonpolar, nonporous surface, the mixture of homoduplex and heteroduplex DNA fragments being applied in a first solution containing a counterion and a DNA binding concentration of driving solvent. While maintaining the media and the solution at a temperature which will locally denature the heteroduplex fragments at the mismatch site thereof, separating desired homoduplex and/or heteroduplex DNA fragments from the separation media by contacting the separation media with a second solution containing a counterion and a concentration of driving solvent which has been predetermined to separate the target homoduplex and/or heteroduplex DNA fragments from the separation media in separate fractions. When the desired fragments are a homoduplex fraction, the concentration of driving solvent is selected to remove one or both of the homoduplex fractions as separate fractions from homoduplex fractions. Alternatively, when the desired fragments are a heteroduplex fraction, the concentration of driving solvent is selected to remove one or both of the heteroduplex fractions as separate fractions from homoduplex fractions.

The heteroduplex fraction can be collected and amplified. The amounts of the heteroduplex fragments to homoduplex fragments is less than 1:1. The method can be used when the amount of heteroduplex in the separate heteroduplex fraction is below the level of detection.

The retention time used in the separation of the homoduplex or heteroduplex fraction can be previously determined from a reference standard. The reference standard can be obtained by separating a standard mixture of homoduplex and heteroduplex, having the same base pair sequence as the sample, by Matched Ion Polynucleotide Chromatography.

This method can be used to determine the presence or absence of a homoduplex or a heteroduplex faction in a mixture of homoduplex and heteroduplex DNA fragments having the same base-pair length, the heteroduplex fragments having at least one mismatch site. The recovered fragments can be cloned. The method is applicable when the DNA sample contains a large background of wild type and when the mutant DNA is below the limit of detection, when the DNA sequences of the wild type DNA and the mutant DNA are known, and when the mutant DNA differs from wild type DNA by at least one base pair.

In summary, an ambient or low pressure device of this invention for separating polynucleotide fragments from a mixture of polynucleotide fragments comprises a tube having an upper solution input chamber, a lower eluant receiving chamber, and a fixed unit of separation media supported therein. The separation media has nonpolar separation surfaces which are free from multivalent cations which would react with counterion to form an insoluble polar coating on the surface of the separation media.

The separation media can be beads, capillary channels or monolith structures. The fixed unit of separation media can comprise a fixed bed of separation media particles, and the separation media particles can be organic polymer or inorganic particles having a nonpolar surface.

In one embodiment, the lower chamber is closed. In other embodiments, the lower chamber has an open bottom portion. The tube can be combined with a eluant container shaped to receive the lower chamber. The eluant chamber can be a centrifuge vial.

In one embodiment, the tube is a member of an array of tubes and the eluant container is a member of an array of eluant containers, and the array of tubes and array of containers have matching configurations.

An ambient or lower pressure separation system of this invention comprises a combination of multicavity separation plate having outer sealing edges, a multiwell collection plate and a vacuum system. The vacuum system has a separation plate sealing means forming a sealed engagement with the outer sealing edges of the multicavity separation plate and a vacuum cavity receiving the multiwell collection plate. The multicavity separation plate includes an array of tubes, each tube having an upper solution input chamber, a lower eluant receiving chamber with a bottom opening therein, and a fixed unit of separation media supported therein. The separation media can have nonpolar separation surfaces which are free from multivalent cations which would react with counterion to form an insoluble polar coating on the surface of the separation media. The multiwell collection plate has collection wells which are positioned to receive liquid from the bottom opening of the lower eluant receiving chamber. The separation media can be beads, capillary channels or monolith structures. The fixed unit of separation media comprises a fixed bed of separation media particles. The separation media particles can be selected from the group consisting of organic polymer and inorganic particles having a nonpolar surface.

BRIEF DESCRIPTION OF THE DRAWINGS

FIG. 3 is a cross-sectional view of a high pressure separation column suitable for use in the apparatus of FIGS. 1 and 2.

FIG. 7 is a cross-sectional representation of a spin vial system for low pressure separations according to this invention.

FIG. 20 is a chromatogram of the separated 458 bp fragment obtained in the procedure of Example 1.

FIG. 22 is a chromatogram of a pUC 18 Msp I standard mixture of dsDNA fragments used in Example 3.

DETAILED DESCRIPTION OF THE INVENTION

Figure 1:
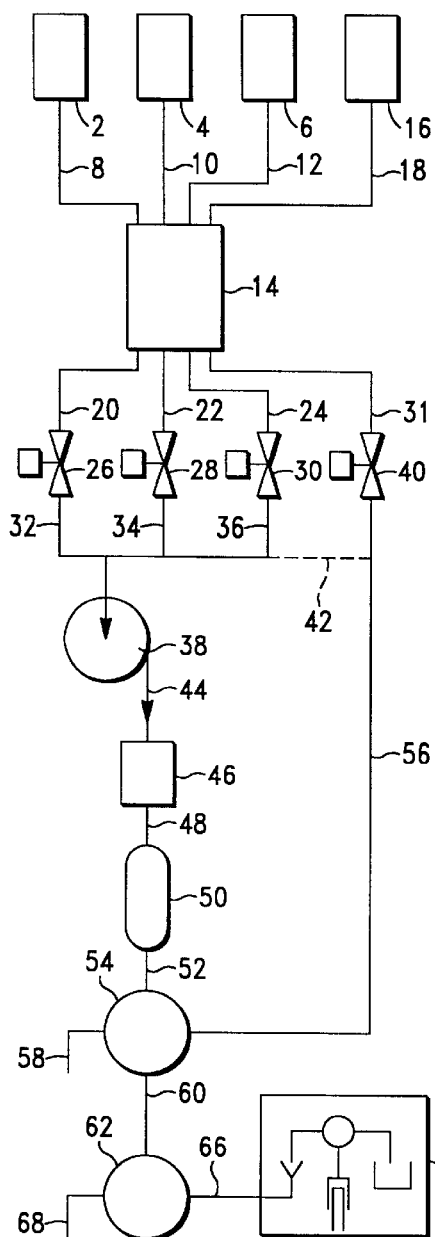
FIG. 1 is a schematic representation of a high pressure system for performing the matched ion pair chromatography (MIPC) method of this invention, with a proportioning valve system for effecting gradients of solvent concentrations in the separation.

Although the method of the invention relates to polynucleotides in general, the discussion to follow will reference double-stranded DNA (dsDNA) for the sake of simplicity only and not by way of limitation.

The term "Matched Ion Polynucleotide Chromatography" as used herein is defined as a process for separating single and double-stranded polynucleotides using nonpolar separation media, wherein the process uses a counterion agent, and an organic solvent to release the polynucleotides from the separation media. MIPC separations are complete in less than 10 minutes, and frequently in less than 5 minutes. MIPC systems (WAVE® DNA Fragment Analysis System, Transgenomic, Inc. San Jose, Calif.) are equipped with computer controlled ovens which enclose the columns and sample introduction areas.

A "gradient", as defined herein, is a chromatographic mobile phase defined by an initial time point having an initial solvent composition and a final time point having a final solvent composition which is different from the initial solvent concentration, and the gradient composition continually changes (e.g. usually increases) from the initial solvent composition to the final solvent composition over the time interval between the initial and final time points. A gradient mobile phase is used to elute fragments from a chromatography column for the purpose of separating the components in a mixture.

The term "isocratic" is defined herein to denote a chromatographic mobile phase whose composition remains essentially constant for any part of or all of the duration of the chromatographic separation process. The term "isocratic" is intended to include a process wherein a single solvent concentration is maintained throughout the separation, a process where the solvent concentration is stepped from one constant concentration to one or more constant concentrations in a sequence of steps, or a process with a gradient separation and with one or more portions conducted under constant solvent concentration conditions. An isocratic mobile phase is used to elute fragments from a chromatography column for the purpose of separating a mixture thereon, into its components (Remington: *The Science and Practice of Pharmacy*, 19$^{th}$ Ed., A. Gennaro, Ed. p. 537 (1995)). This reference is incorporated in its entirety herein. The isocratic separation solvent concentration should be maintained within ±1% of the selected isocratic solvent concentration and is preferably maintained within ±0.5% of the selected isocratic solvent concentration. Optimally, the isocratic solvent concentration is maintained with ±0.1% of the selected isocratic solvent concentration.

The term "partially denaturing" means the separation of a mismatched base pair (caused by temperature, pH, solvent, or other factors) in a DNA double strand while the remainder of the double strand remains intact.

There is generally a wide range of interactions with the column. Typically, fragments of many various sizes are analyzed. For example, separation of fragments of 80 to 600 base pairs on MIPC columns require acetonitrile concentrations of about 8.75% to 16.25%, respectively. Longer fragments require further increases in acetonitrile concentrations. Therefore, to perform separation of an entire range of fragment sizes, a gradient process is necessary. Otherwise, it is not possible to separate this range of sizes.

The apparatus of this invention provides a novel and unique method for separating and purifying double-stranded oligonucleotides and single-stranded DNA fragments, RNA, single-stranded DNA fragments, plasmids and the like. The device simplifies the separation procedure and applies a unique size-based separation process based on our Matched Ion Pair Chromatography (MIPC), also denoted herein by the term DNA Chromatography. This process exploits the binding characteristics with nonpolar surfaces of separation media in the presence of counterion and materials to be separated. Materials in aqueous solutions of the counterion and low stripping solvent concentrations bind to the nonpolar surfaces, and the materials are subsequently released from the surface by application of a stripping solvent concentration which removes or strips materials from the separation media surface, the size of the materials being stripped being a function of the stripping solvent concentration. Larger-sized materials require application of a greater stripping solvent concentration to effect their release. The ratio of fragment size desorbed from the media to the concentration of stripping solvent can be calibrated and is so reproducible that it can be calculated with high accuracy. The process can be applied with any system which can retain the separation media and provides means to rapidly pass liquids through the separation media.

FIG. 1 is a schematic representation of a high pressure system for performing the MIPC method of this invention, with a proportioning valve system for effecting gradients of solvent concentrations in the separation. Chromatographic solutions such as solvents, counterions, and other solutions to be mixed with the solvents are maintained in solvent container 2, carrier liquid container 4, and auxiliary liquid (e.g., a co-solvent) container 6 having respective solvent transport tubing 8, carrier transport tubing 10 and auxiliary liquid transport tubing 12 communicating therewith and leading to degasser 14.

Figure 2:
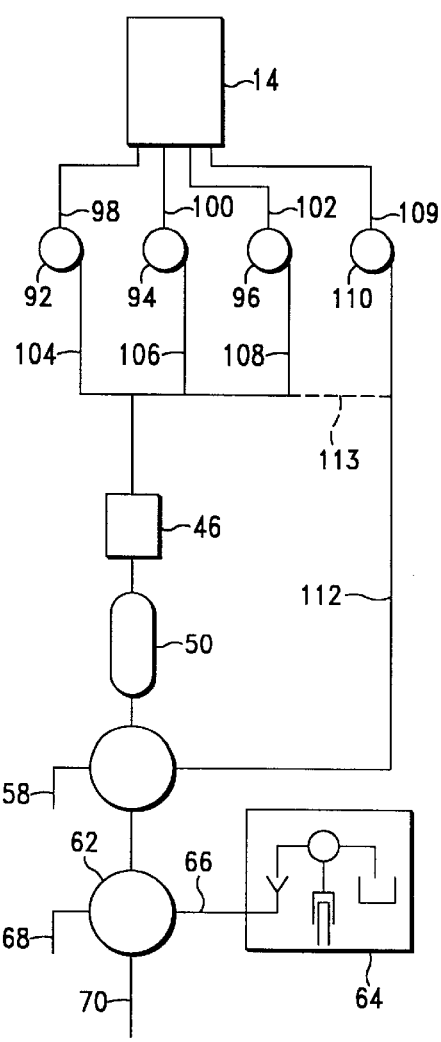
FIG. 2 is a partial schematic representation corresponding to the representation of FIG. 1, but with a proportioning pump system for effecting gradients of solvent concentrations in the separation system with proportioning valve

Column cleaning solution is contained in cleaning solution container 16 which likewise has a cleaning solution transport conduit 18 communicating therewith leading to the degasser 14. In this embodiment, the cleaning solution can flow by gravity pressure if the container 16 is elevated above the degasser and injection valve 54. Alternatively, a pump as shown in FIG. 2 can be provided to achieve cleaning solution flow.

Degassed solvent conduit 20, degassed carrier liquid conduit 22, and degassed auxiliary liquid conduit 24 leading from the degasser 16 communicate with respective solvent proportioning valve 26, carrier liquid proportioning valve 28, and auxiliary liquid proportioning valve 30. The settings for these proportioning valves are set and changed by valve operators such as stepper motors associated therewith, and these valve operators respond to establish a desired set of settings in response to commands from the valve operator control module described in greater detail hereinafter. The settings for these proportioning valves control the ratio of liquids (co-solvents, driving solvents, etc.) through the injector valve and the separation column. Conduits 32, 34, and 36 lead from respective proportioning valves 26, 28 and 30 to the intake of the pump 38. The degasser 14 removes dissolved gases from the liquids. Removal of dissolved oxygen is particularly important because its presence increases the risk of oxidizing ferrous or other oxidizable metals in the system components and thus introducing the corresponding cations into the liquid.

The cleaning solution transport conduit 31 leads to a cleaning solution valve 40. An optional cleaning solution conduit 42 leads from the valve 40 and communicates with the inlet of the pump 38.

The openings of valves 26, 28 and 30 accurately set the relative ratios of the solvent or solvents to carrier liquid, a most important part of this system because the size-based DNA separation by MIPC is a function of solvent concentration. As will be described with regard to the various DNA fragment separation processes, the slope of the solvent gradient as a function of time is changed during the separation process, and the most critical phase may require a very precise gradient, or for some processes, a highly precise isocratic (constant solvent concentration) composition. The settings of the valves 26, 28 and 30 are established by conventional valve actuators which can be remotely set by signals to a conventional valve control device. As will be described in greater detail hereinafter, the control system of this invention provides computer controlled instructions which establish the settings of valves 26, 28 and 30 to precise flow values at appropriate times during the operation of the system.

In a similar manner, the control system of this invention provides computer controlled instructions to establish the operational parameters of the pump 38, such as the off/on status of the pump and the pressure or flow rate settings of the pump.

Pump outflow conduit 44 communicates with the in-line mixer 46, directing the liquid flow through the mixer 46 for thorough mixing of the components. Mixed liquid outflow conduit 48 communicates with guard column 50 to treat the mixed liquid to remove multivalent metal cations and other contaminants which would interfere with the separation of DNA fragments. Guard column 50 can contain a cation exchange resin in sodium or hydrogen form for removal of multivalent metal cations by conventional ion exchange. Conduit 52 communicates with the outlet of the guard column and an inlet port of a cleaning solution injector valve 54. Waste supply conduit 56 connects valve 40 with the cleaning solution injector valve 54, and waste outlet conduit 58 leads to waste. Conduit 60 leads from the waste solution injector valve 54 to the sample injection valve 62.

Sample aliquot selector 64 communicates with injector valve 62 through sample conduit 66. Waste conduit 68 leads from the injector valve and removes waste liquids.

In the injector valve 62, the sample is introduced into a stream of solvent and carrier liquid passing through the valve from conduit 60. Sample conduit 70 communicates with an outlet port of injector valve 62 and with the column prefilter 74 in the air bath oven 72. The capillary tubing coil 76 communicates with the prefilter 74 and the inlet of separation column 78. The extended length of the capillary coil 76 allows ample heat to pass from the heated oven air into the liquid passing through the coil, bringing the liquid within ±0.05° C. of a selected temperature. The oven 72 establishes this temperature uniformity in the prefilter 74, coil 76, and separation column 78.

The separation column 78 is packed by conventional column construction with beads having a unique separation surface which effects a size-based separation of DNA fragments in the presence of a matched counterion by the MICP process. The separation process and details about the beads are described in detail hereinafter. A stream (eluant) containing base pair length size-separated DNA fragments passes from the separation column 78 through eluant conduit 80.

Analyzer 84 communicates with conduit 80 . The analyzer cell 84 can be a conventional UV absorbance measurement device which measures the UV absorbance level of the native DNA fragment structures in the liquid. The absorption level is a function of the concentration of the DNA fragments in the liquid being tested.

Alternatively, if the DNA is labeled with a fluorescent marker, the analyzer continuously measures the level of the fluorescent marker in the liquid by detecting the emission level at the frequency most appropriate for the marker. Similarly, if the DNA is labeled with a mass tag, the detector can be a mass spectrophotometer. It will be readily apparent that any analyzing system capable of continuously measuring a characteristic of the liquid which is a function of the concentration of the DNA fragments therein is suitable and intended to be within the scope of this invention The eluant passes from the analyzer 84 to the fragment collector 88. In the fragment collector 88, selected portions of the eluant containing a separated DNA fraction are collected in a vials for later processing or analysis. Uncollected fractions are removed through waste conduit 90.

The DNA separation process is impaired by the presence of multivalent cations. In the above description, the liquid flow system is described as a series of conduits. The conduits are capillary tubing selected to avoid introduction of multivalent cations into the liquids. The preferred capillary tubing materials are titanium and PEEK. For similar reasons, the other components of the system are preferably made of titanium or PEEK or have the surfaces exposed to the liquid coated with PEEK to protect them from oxidation and prevent the introduction of multivalent cations into the liquid. Moreover, titanium and PEEK parts, tubing and surfaces can be additionally treated to remove contaminants.

Stainless steel can also be used provided it has been treated to remove all oxidized surface materials and the solutions contacting the stainless steel surfaces are free of dissolved oxygen.

FIG. 2 is a partial schematic representation corresponding to the representation of FIG. 1, but with a proportioning pump system for effecting gradients of solvent concentrations in the separation. This system relies on proportioning pumps to control the ratio of solvents to carrier liquids. The inlets of proportioning pumps 92, 94 and 96 by way of their respective supply conduits 98, 100, and 102 communicate with the degasser 14, and by way of their respective outlet conduits 104, 106 and 108 communicate with the inline mixer 46. The operational speeds for these proportioning pumps are calibrated to flow rates therethrough and are controlled by a proportioning pump control module described in greater detail hereinafter. The settings for these proportioning valves control the liquid flow speed and the ratio of liquids (co-solvents, driving solvents, etc.) through the injector valve and the separation column.

A pump 110 can supply cleaning solution to the system through optional conduit 112. An optional conduit 113 can lead from conduit 112 and communicate with the in-line mixer 46.

FIG. 3 is a partially exploded representation of the physical structure of a representative separation column. The column comprises a column tube 120 with external threads on both ends. The tube is filled with separation media 122. A frit 124 is held against the upper surface of the separation media by the frit plug 126. An internally threaded coupling 128 is secured to the end of the tube 120 and receives the frit 124 and frit plug 126. The internally threaded coupling 128 receives the externally threaded coupling 130 in a threaded engagement. The externally threaded coupling 130 has an internally threaded end receptor 132 for receiving a capillary tubing end coupler (not shown).

The separation media 122 are organic polymer materials or inorganic materials having the requisite structure and nonpolar surfaces as described in greater detail hereinafter.

The methods of this invention for isolating targeted DNA fragments having a predetermined base-pair length from a mixture of DNA fragments comprise the following steps. A mixture of DNA fragments is applied to a separation column containing separation media having a nonpolar, nonporous surface, the mixture of DNA fragments being in a first solution containing counterion and a DNA binding concentration of driving solvent. The targeted DNA fragments are then removed from the media by contacting the media with a second solution containing counterion and a concentration of driving solvent which has been predetermined to remove DNA fragments having the targeted fragments from the separation media into a distinct segment of eluant.

The present invention relates, therefore, to the isolation of DNA fragments having a predetermined base pair (bp) length from a mixture of fragments. It also relates to the isolation in a mixture of DNA fragments having an identical bp length, heteroduplex fragments from homoduplex fragments, heteroduplex fragments from one another and homoduplex fragments from one another. For example, the technology of this invention can be applied to the Sklar et al process (supra) to achieve an unambiguous detection and identification of very small amounts of heteroduplex fragments containing mutant DNA in the presence of a relatively very large amount of known wild type using our Denaturing Matched Ion Polynucleotide Chromatography (DMIPC), a method analogous to Matched Ion Polynucleotide Chromatography (MIPC).

MIPC separates DNA fragments based on their base pair length (U.S. Pat. No. 5,585,236 to Bonn (1996); Huber, et al., Chromatographia 37:653 (1993); Huber, et al., Anal. Biochem. 212:351 (1993)). These references and the references contained therein are incorporated herein in their entireties. When MIPC analyses are performed at partially denaturing temperature, the process is called DMIPC. These separation methods obviate the deficiencies of gel-based methods and make possible the collection and identification of mutant DNA fragments whose concentration relative to wild type is small, and may be below the detection limits of a detector. Alternatively, MIPC and DMIPC make possible the collection and identification of mutant fragments which would be obscured by a relatively large amount of wild type in a sample, as exemplified in the Sklar et al process (supra). This method will be discussed in detail herein below.

MIPC uses unique nonpolar separation media which comprises organic polymers, silica media having a nonpolar surface comprising coated or covalently bound organic polymers or covalently bound alkyl and/or aryl groups, and continuous nonpolar separation media, i.e., beads, monolith or rod columns, capillary tubing or blocks containing capillary sized passageways or channels, or other nonpolar surfaces of material such as organic polymer or nonpolar surfaced silica gel. The separation media used in MIPC can be porous or nonporous. A detailed description of the MIPC separation process, MIPC separation media, and MIPC systems is found in U.S. Pat. No. 5,772,889 (1998) to Gjerde and in co-pending U.S. patent applications Ser. Nos. 09/058,580 filed Mar. 10, 1998; 09/058,337 filed Mar. 10, 1998; 09/081,040 filed May 18, 1998; 09/080,547 filed May 18, 1998; 09/169,448 filed Oct. 9, 1988 (pending); Ser. No. 09/183,123 filed Oct. 20, 1998; and Ser. No. 09/183,450 filed Oct. 20, 1998. MIPC systems and separation media are commercially available (WAVE™ DNA separation system, WAVEMAKER™ DNA separation system software and DNASEP® DNA separation columns from Transgenomic, Inc. San Jose, Calif.). The entire MIPC analysis can be automated by means of a desk top computer and a sample auto-injector. Analytical data for each sample can be analyzed in real time, or collected and stored in a computer memory device for analysis at a later time.

The use of MIPC at partially denaturing temperature, i.e., DMIPC, to detect mutations has been described in a co-pending U.S. patent application Ser. No. 09/129,105 filed Aug. 4, 1998. This application and the references contained therein are incorporated herein in their entireties.

The MIPC method is highly reproducible. Therefore, columns do not have to be calibrated from sample to sample or from day to day. A DNA fragment of a particular base pair length will elute from an MIPC column at a specific retention time which is reliably reproducible. This characteristic, coupled with the automation, sample collection, and rapid sample analysis capabilities of MIPC make this method uniquely suited for detection of minute quantities of mutations in the presence of a large background of wild type.

The MIPC method of this invention has been found to involve a unique relationship between the concentration of the organic (driving) solvent in the mobile phase and the hydrophobic stationary phase. The strong affinity of the polynucleotide fragments for the stationary phase dominates the interactions until the solvent concentration reaches a critical range for each fragment size. Within the critical range, the solvent competes with the stationary phase, and the fragment is released or desorbed and quickly reaches the velocity of the eluant. For separation processes using a solvent gradient, the fraction released is a simple direct function of the solvent concentration, a binding and release relationship which is not column length dependent.

If the solvent concentration is maintained at a constant level within the critical range for a fragment size (isocratic separation), the competitive phase is attenuated, and the separation of the fractions in the eluant shows some enhancement with increased column length. If the solvent concentration changes in a very slight gradient through the critical range for a fragment size, the rate of full release of the fragment into the eluant is increased, and the competitive phase is quickly diminished.

In other words, when the solvent gradient favors the quick release of the fragments, the column length becomes insignificant because the complete separation process occurs within a very short distance at the top of the column. As the slope of the solvent gradient is reduced and nears an isocratic process, the competition with the stationary phase extends over an increasing length of the column, delaying full release of the fraction into the eluant.

With the MIPC separation process, in contrast, the DNA is applied to the nonpolar, nonporous surfaces of the separation media in a dilute solution of driving solvent, cosolvent, and counterion. The DNA binds at the top of a column. We have discovered that the base pair length determined separation of the DNA from the separation media is entirely a function of driving solvent concentration in the cosolvent. Controlling the driving solvent concentration as a function of time isolates a target DNA fragment from the column as a function of time in an entirely predictable manner.

The method can be used to collect and amplify the target DNA fragments. The procedure can be used as an assay to determine whether or not the target DNA fragments are present in the sample. So the method can be applied when no DNA fragments having the base pair length of the target DNA are present and when DNA fragments having the base pair length of the target DNA are present.

Isocratic elution provides far better separation of component fragments having small differences in lengths than could be achieved with a gradient elution. Therefore, in one embodiment, the present invention provides a method for enhancing the separation of dsDNA fragments on an MIPC column by using an isocratic mobile phase to elute fragments from the column.

Separations of dsDNA fragments by MIPC under isocratic elution conditions are extremely sensitive to solvent composition. Small changes in the composition of solvent mixtures contained in solvent reservoirs can occur as a result of evaporation. Such changes can result in differences in the retention times of fragments from identical samples. To prevent changes in retention time resulting from changing solvent composition it is important to keep solvent reservoir bottles tightly closed with caps, PARAFILM, aluminum foil, or similar materials. In addition, when helium sparging is used to de-gas solvents, the flow of gas should be reduced to a minimum in order to minimize the evaporation of solvent. The use of an in-line degasser is a preferred method used to minimize solvent evaporation and maintain constant solvent composition. An example of a suitable degasser is DEGASET, Model 6324 (MetaChem Technologies, Torrance, Calif.).

There are several types of counterions suitable for use with MIPC. These include a mono-, di-, or trialkylamine that can be protonated to form a positive counter charge or a quaternary alkyl substituted amine that already contains a positive counter charge. The alkyl substitutions may be uniform (for example, triethylammonium acetate or tetrapropylammonium acetate) or mixed (for example, propyldiethylammonium acetate). The size of the alkyl group may be small (methyl) or large (up to 30 carbons) especially if only one of the substituted alkyl groups is large and the others are small. For example octyidimethylammonium acetate is a suitable counterion agent. Preferred counterion agents are those containing alkyl groups from the ethyl, propyl or butyl size range.

The mobile phase preferably contains a counterion agent. Typical counterion agents include trialkylammonium salts of organic or inorganic acids, such as lower alkyl primary, secondary, and lower tertiary amines, lower trialkyammonium salts and lower quaternary alkyalmmonium salts. Examples of counterion agents include octylammonium acetate, octadimethylammonium acetate, decylammonium acetate, octadecylammonium acetate, pyridiniumammonium acetate, cyclohexylammonium acetate, diethylammonium acetate, propylethylammonium acetate, propyldiethylammonium acetate, butylethylammonium acetate, methylhexylammonium acetate, tetramethylammonium acetate, tetraethylammonium acetate, tetrapropylammonium acetate, tetrabutylammonium acetate, dimethydiethylammonium acetate, triethylammonium acetate, tripropylammonium acetate, tributylammonium acetate. Although the anion in the above examples is acetate, other anions may also be used, including carbonate, phosphate, sulfate, nitrate, propionate, formate, chloride, and bromide, or any combination of cation and anion. These and other agents are described by Gjerde, et al. in *Ion Chromatography, 2nd Ed.*, Dr. Alfred Hüthig Verlag Heidelberg (1987). Counterion agents that are volatile are preferred for use in the method of the invention, with triethylammonium acetate (TEAA) and triethylammonium hexafluoroisopropyl alcohol being most preferred.

To achieve optimum peak resolution during the separation of DNA by MIPC, the method is preferably performed at a temperature within the range of 20° C. to 90° C.; more preferably, 30° C. to 80° C.; most preferably, 50° C. to 75° C. The flow rate is selected to yield a back pressure not exceeding 5000 psi. In general, separation of single-stranded fragments should be performed at higher temperatures.

The temperature at which the separation is performed affects the choice of organic solvents used in the separation. One reason is that the solvents affect the temperature at which a double-stranded DNA will melt to form two single strands or a partially melted complex of double and single-stranded DNA. Some solvents can stabilize the melted structure better than other solvents. The other reason a solvent is important is because it affects the distribution of the DNA between the mobile phase and the stationary phase. Acetonitrile and 1-propanol are preferred solvents in these cases. Finally, the toxicity (and cost) of the solvent can be important. In this case, methanol is preferred over acetonitrile and 1-propanol is preferred over methanol.

When the separation is performed at a temperature within the above range, an organic solvent that is water soluble is preferably used, for example, alcohols, nitriles, dimethylformamide (DMF), tetrahydrofuran (THF), esters, and ethers. Water soluble solvents are defined as those which exist as a single phase with aqueous systems under all conditions of operation of the present invention. Solvents which are particularly preferred for use in the method of this invention include methanol, ethanol, 2-propanol, 1-propanol, tetrahydrofuran (THF), and acetonitrile, with acetonitrile being most preferred overall.

Size based separations using an isocratic mobile phase are best performed below a temperature which will denature a dsDNA. This temperature range comprises 25° C. to about 55° C., with about 50° C. being most preferred.

One aspect of this invention is a method for determining the presence or absence of DNA fragments having a specific base-pair length in a sample mixture. The method comprises the steps of applying the sample mixture to a separation column containing separation media having a nonpolar, nonporous surface, the sample mixture being in a first solvent mixture containing a counterion and a DNA binding concentration of driving solvent in a cosolvent. Then any DNA in the sample having said specific base pair length is removed by contacting the separating media with a second solvent solution containing a counterion and a concentration of driving solvent which has been predetermined to remove DNA fragments having said base pair from the separation media. The separated fraction can be amplified by PCR, for example, to increase the amount of the putative fraction or confirm its absence from the sample.

This invention applies this discovery to purify and isolate mutant fragments by "blind collection". The term "blind collection" is defined herein to mean the collection of mobile phase flowing through an MIPC column over a specific time interval subsequent to application of a DNA sample to the column. More specifically, "blind collection" refers to collecting mobile phase during the retention time interval corresponding to a previously determined retention time interval of a DNA fragment standard. Since the relationship between MIPC retention time and base pair length is highly reproducible, it is not necessary to detect a desired fragment with a detector in order to know when to collect the fragment. Column mobile phase is simply collected at the predetermined and expected retention time of a desired fragment.

Use of a specific concentration of organic component in the isocratic mobile phase results in enhanced separation dsDNA within a relatively narrow range of base pair lengths, referred to herein as a "target range" of base pair lengths. Therefore, in another embodiment, a mixture of dsDNA can be separated using a gradient mobile phase to separate fragments within a selected base pair range. Chromatographic fractions containing fragments within the target range can be isolated and re-chromatographed using an isocratic mobile phase. The enhanced separation afforded by the use of an isocratic mobile phase makes possible the isolation of one or more pure fragments within the target range. Such pure fragments can then be amplified using PCR to provide relatively large quantities of high purity product. High purity dsDNA fragments have many uses, e.g., sequencing, forensic investigations, cloning and sample preparation prior to DNA analysis.

Figure 4:
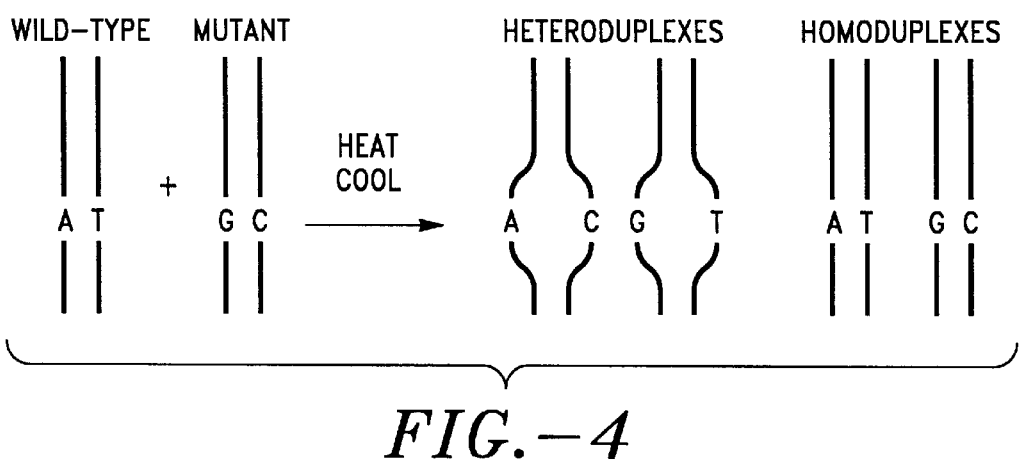
FIG. 4 is a schematic representation of hybridization of wild type DNA strand with homozygous mutant strand showing the production of two homoduplexes and two heteroduplexes.

In another embodiment, the present invention can be used to detect the presence or absence of mutations. In this embodiment, a sample dsDNA is hybridized with wild type. Hybridization, a standard process in the biotechnology art, is effected by heating a solution of sample and wild type DNA to about 90° C. for about 5 minutes, then slowly cooling the solution to ambient temperature over 45 to 60 minutes. During the heating period, the dsDNA strands denature. Upon slow cooling, they recombine in a statistical fashion. Therefore, if the sample contains a mutation, the hybridized product will contain a mixture of two homoduplexes and two heteroduplexes. A schematic of the hybridization process is shown in FIG. 4.

Another aspect of this invention is a method for separating by DMIPC target homoduplex and/or heteroduplex DNA fragments from a mixture of homoduplex and heteroduplex DNA fragments having the same base-pair length, the heteroduplex fragments having at least one mismatch site. The method comprises the steps of applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent. Then, while maintaining the media and the solution at a temperature which will locally denature the heteroduplex fragments at the mismatch site thereof, separating desired homoduplex and/or heteroduplex DNA fragments from the separation media by contacting the separation media with a second solution containing a counterion and a concentration of driving solvent which has been predetermined to separate the target homoduplex and/or heteroduplex DNA fragments from the separation media in separate fractions.

Thus, heteroduplexes and homoduplexes have been separated by HPLC using gradient elution and "partially denaturing conditions" (U.S. Pat. No. 5,795,976 to Oefner (1998)). However the separations achieved by Oefner were poorly resolved and not always reproducible.

Gradient elution MIPC under partially denaturing conditions achieves good separations of homo and heteroduplexes, as described in U.S. patent application Ser. No. 09/129,105, filed Aug. 4, 1998. This reference and the references contained therein are incorporated in their entireties herein. MIPC separates dsDNA fragments by base pair length under non-denaturing conditions. However, under partially denaturing conditions, a structural component effects the separation as well. Therefore, homoduplexes and heteroduplexes separate from each other when MIPC is conducted at partially denaturing temperature. The partially denaturing temperature varies with the sequence of any given DNA fragment. However, a preferred partially denaturing temperature is achieved between 50° C. to 70° C. a most preferred partially denaturing temperature is 53° C. to 62° C., and an optimum partially denaturing temperature is about 56° C. Liquid chromatographic separation of homoduplexes and heteroduplexes using an isocratic mobile phase has not been previously reported.

In this embodiment of the present invention, the hybridized dsDNA mixture is applied to a MIPC column comprising nonpolar separation media and the fragments are eluted with an isocratic mobile phase. The difference in retention time, shown in FIG. 31, of the heteroduplexes and homoduplexes is more than two minutes, a completely unambiguous separation and a great improvement over a similar separation using gradient elution. This wide separation can be used to advantage to collect and isolate a heteroduplex as it elutes from the column. PCR amplification of the heteroduplex will provide sufficient pure material for sequence determination or other applications which require high purity material.

In a preferred embodiment of the present invention, "kinetic separations" are used for mutation detection and utilize MIPC separation at a temperature which yields partial melting of mismatches. This embodiment achieves better resolution between heteroduplexes and homoduplexes. When mixtures of DNA fragments are applied to an MIPC column, they are separated by size, the smaller fragments eluting from the column first. However, when MIPC is performed at an elevated temperature which is sufficient to denature that portion of a DNA fragment which contains a non-complimentary base pair or polymorphism, then heteroduplexes separate from homoduplexes.

The "kinetic separation" is a method of separation performed under isocratic or near-isocratic conditions where the temperature conditions are selected so that the hysteresis effect (illustrated in FIG. 32) is used to enhance the separation of heteroduplexes and homoduplex species. The temperature is selected so that the partially melted heteroduplex species does not interact with the stationary phase but travels through the column almost at the linear velocity of the mobile phase. The homoduplex interacts or is adsorbed by the column and elutes later.

During the cooling step of hybridization, the higher melting homoduplexes rapidly renature completely while the heteroduplexes, having been more extensively denatured during heating, renature slowly. Cooling while melting temperatures are fixed is equivalent to maintaining a constant temperature and raising the melting temperature.

Figure 32:
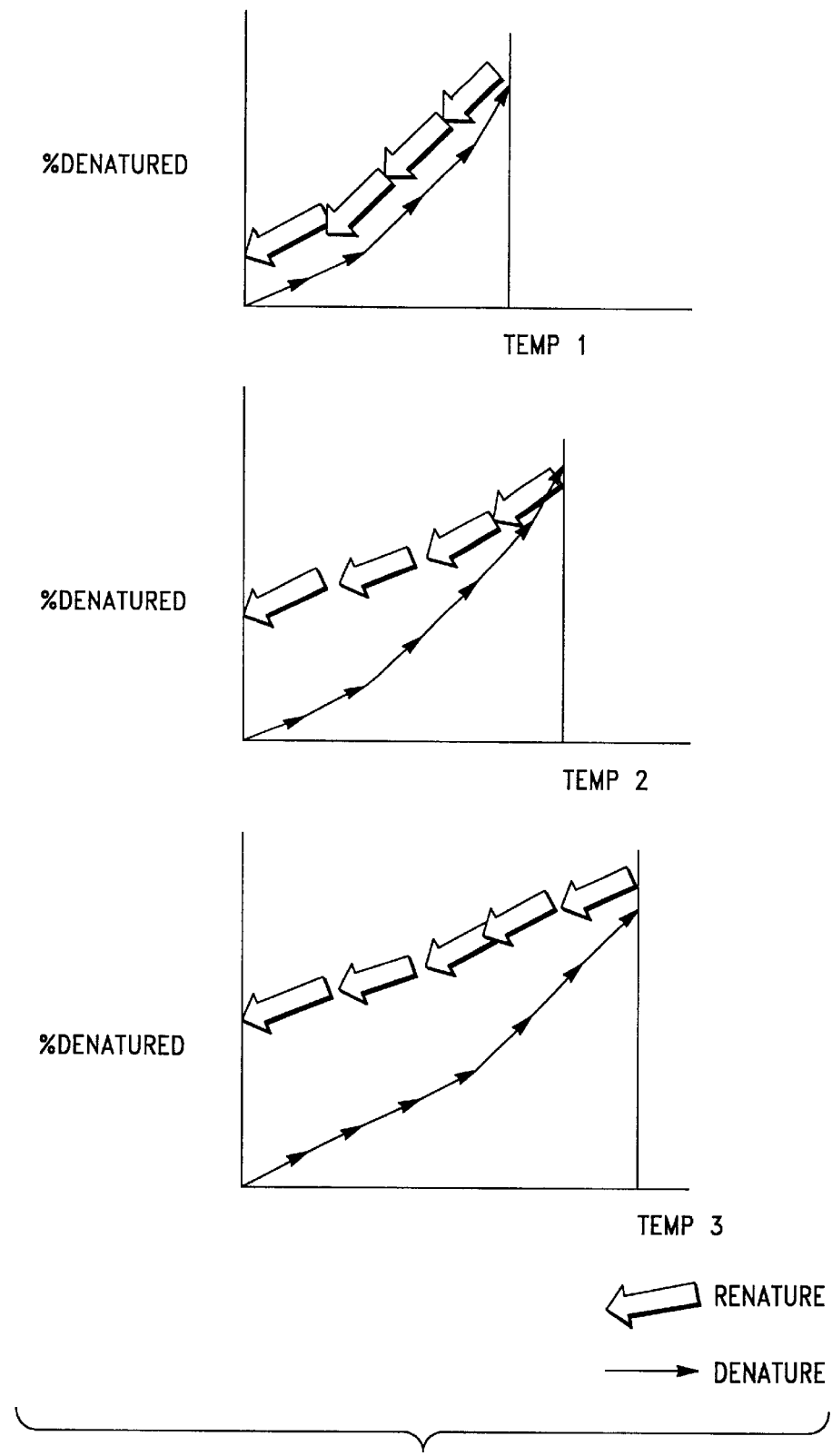
FIG. 32 illustrates the hysteresis effect obtained in kinetic separation.

FIG. 32 illustrates the effect of higher temperatures on percentage of denaturation. Renaturation is kinetically slow beyond a critical degree of denaturation. That is, the higher the temperature used for denaturation, the longer the time required for renaturation to occur.

One aspect of the present invention provides a method which can be used to isolate mutations in a sample containing a relatively large amount of wild type, wherein the concentration of the mutation can be below the limits of detection by a detector. Alternatively, the invention provides a method for detecting mutations when the concentration of mutant DNA in a sample may be sufficient to detect, but the mutant DNA is not seen because it is obscured by the relatively large amount of wild type in the sample. The invention takes advantage of the unique and surprising attributes of MIPC and DMIPC to accomplish the objective of detecting mutations in such samples, wherein the wild type and mutant are known.

One aspect of this invention is a method for determining the presence or absence of a homoduplex or a heteroduplex faction in a mixture of homoduplex and heteroduplex DNA fragments having the same base-pair length, the heteroduplex fragments having at least one mismatch site. This procedure comprising the steps of applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent. Then, while maintaining the media and the solution at a temperature which will locally denature the heteroduplex fragments at the mismatch site thereof, separating desired homoduplex and/or heteroduplex DNA fragments from the separation media by contacting the separation media with a second solution containing a counterion and a concentration of driving solvent which has been predetermined to separate the target homoduplex and/or heteroduplex DNA fragments from the separation media in separate fractions.

In the detection of mutations, the PCR primers are preferably selected to yield fragments for which complete resolution of heteroduplexes from homoduplexes can be achieved by MIPC. Details for suitable primer selection are provided in copending U.S. patent application Ser. No. 09/129,105 filed Aug. 4, 1998, the entire contents of which are hereby incorporated by reference.

In one preferred embodiment, the invention comprises a number of steps which eliminate any ambiguity regarding the presence or absence of a particular mutant fragment in a sample when the sample contains a large amount of wild type DNA relative to a putative mutation. These steps are described hereinbelow.

The method for separating homoduplex and heteroduplex DNA fragments from a mixture of homoduplex and heteroduplex DNA fragments by DMIPC comprises the steps of applying the mixture of homoduplex and heteroduplex DNA fragments to a separation column containing media having a nonpolar, nonporous surface. The mixture of DNA fragments are applied in a first solvent mixture containing a counterion and a DNA binding concentration of driving solvent in a cosolvent. The desired DNA fragments are separated from the media by contacting the media with a second solvent solution containing a counterion and a concentration of driving solvent in cosolvent which has been predetermined to selectively remove the desired fragments.

The desired fragments can be a homoduplex fraction. The concentration of driving solvent is selected to remove the homoduplex fraction, and the homoduplex fraction is collected. The collected fractions can be amplified to obtain an increased ratio of heteroduplex relative to homoduplex. Alternatively, the desired fragments can be a heteroduplex fraction, and the concentration of driving solvent is selected to remove the heteroduplex fraction, and the heteroduplex fraction is collected.

The method is particularly useful in the Sklar et al methods, that is, when the DNA sample contains a large background of wild type, the mutant DNA is below the limit of detection, the DNA sequences of the wild type DNA and the mutant DNA are known, and the mutant DNA differs from wild type DNA by at least one base pair.

In these separation methods, the retention time used in the separation of the homoduplex or heteroduplex fraction is determined from a reference standard which can be obtained, for example, by separating a standard mixture of homoduplex and heteroduplex, having the same base pair sequence as the sample, by Matched Ion Polynucleotide Chromatography. In the gradient and isocratic separation of DNA mixtures, and in the denaturing MIPC methods, the retention time used in the separation of the homoduplex or heteroduplex fraction can be previously determined from a reference standard and is highly predictable. The reference standard can be obtained in the denaturing MIPC methods, for example, by separating a standard mixture of homoduplex and heteroduplex, having the same base pair sequence as the sample, by Matched Ion Polynucleotide Chromatography and identifying the elution time or times for the desired fragments.

Figure 5:
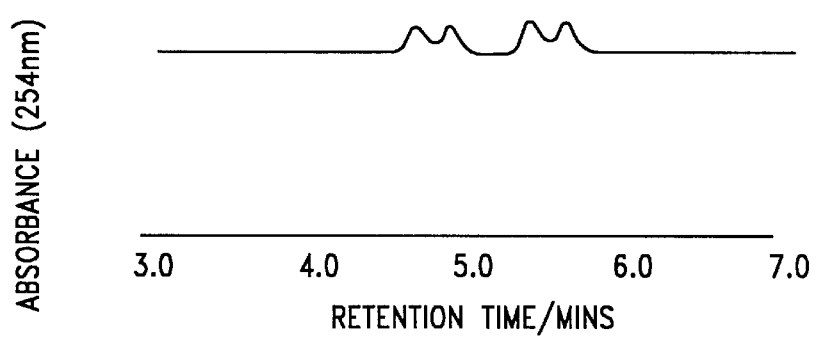
FIG. 5 is a DMIPC chromatogram showing the separation of a standard mixture of FIG. 4.

Since the base sequence of the sample wild type DNA and the putative mutation are known, standards of these materials are combined and hybridized. Hybridization is effected by heating the combined standards to about 90° C., then slowly cooling the reaction to ambient temperature over about 45 to 60 minutes. During hybridization, the duplex strands in the sample denature, i.e., separate to form single strands. Upon cooling, the strands recombine. If a mutant strand was present in the sample having at least one base pair difference in sequence than wild type, the single strands will recombine to form a mixture of homoduplexes and heteroduplexes. In this manner, a standard mixture of homoduplexes and heteroduplexes is formed as depicted schematically in FIG. 4. The standard mixture contains the same homoduplexes and heteroduplexes present in a sample which contains a putative mutation, albeit not in the same ratio. This standard mixture cannot be separated by MIPC under normal conditions, since the heteroduplex and homoduplex have the same base pair length. However, when MIPC is performed at a temperature sufficiently elevated to selectively and partially renature a heteroduplex at the site of base pair mismatch (DMIPC), the partially denatured heteroduplex will separate from a homoduplex having the same base pair length. Therefore, the hybridized standard mixture is applied to a MIPC column and a separation is performed under DMIPC conditions. The chromatogram so produced shows a separation of the homoduplexes and heteroduplexes as shown in FIG. 5. The retention times of the separated homoduplex and heteroduplex standards can then be used to predict the retention times of putative mutations having a concentration too low to be detected by a detector. Alternatively, the retention times of the separated homoduplex and heteroduplex standards can then be used to predict the retention times of putative mutations in samples wherein the mutation signal is obscured by the wild type signal.

Having determined the retention times of the standards, a sample containing a putative mutation is amplified using PCR to increase the total quantity of sample. Since the sequence is known, primers can be designed to maximize the fidelity of replication and minimize the formation of reaction artifacts and byproducts. Approaches to primer design and PCR optimization for mutation detection by DMIPC are discussed in co-pending U.S. patent application Ser. No. 09/129,105 filed Aug. 4, 1998. However, wild type and mutant DNA strands in a sample have a nearly identical base sequence. A mutation may contain only one base pair difference compared to wild type. Therefore, primers cannot be designed to selectively anneal to, and preferentially amplify the mutant strand in the presence of wild type. Therefore, when such a sample is amplified using PCR, the ratio of mutant to wild type in the amplified product will be the same as in the original sample.

When the amplified sample is analyzed using MIPC a single major peak will be seen in the resulting chromatogram. This peak represents the combined wild type and mutant DNA, if the latter is present. No separation is achieved because the mutant and wild type DNA have the same base pair length. Therefore, the amplified sample is hybridized and analyzed under partially denaturing conditions by DMIPC. However, the heteroduplex corresponding to the putative mutation, if present, will not be seen by the detector either because its concentration is below the detection limits of the detector or because the ratio of wild type to putative mutation is very large so that the wild type homoduplex peak obscures the heteroduplex peak.

In either case, the heteroduplex corresponding to the mutant DNA in the original sample need not be seen as a chromatographic peak to be determined. Having previously identified the retention time of the heteroduplex standard, the mobile phase is "blind collected" from the column at the expected retention time.

Figure 6:
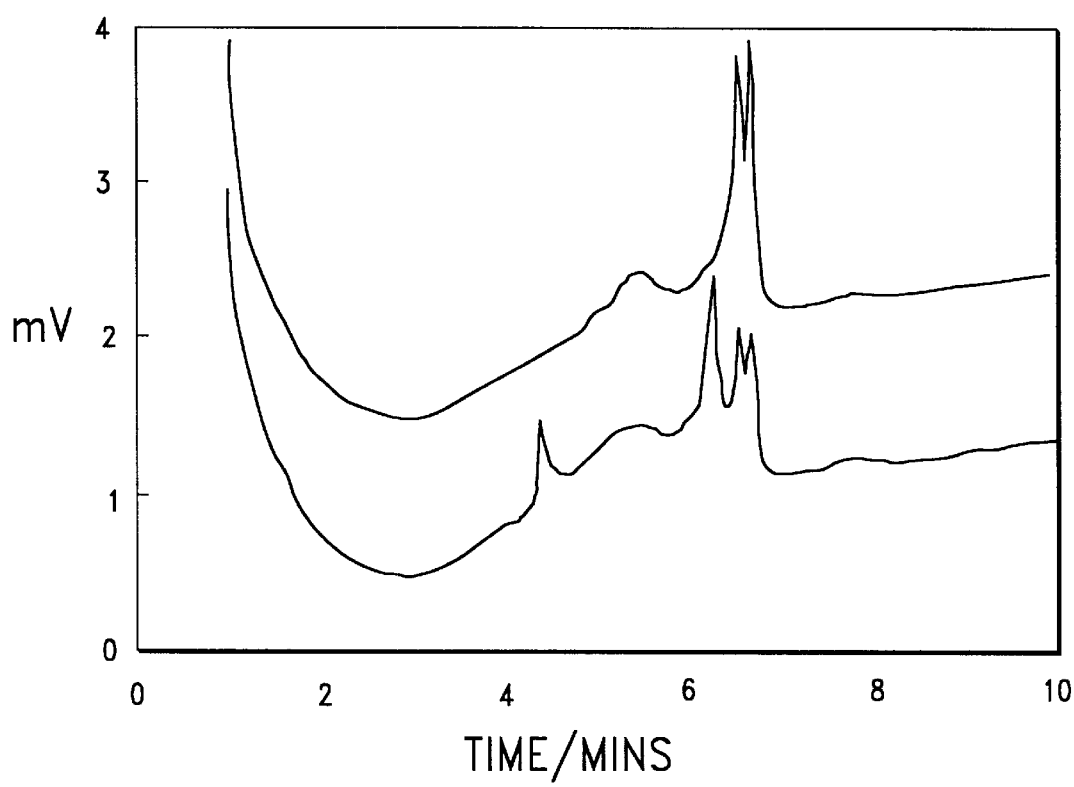
FIG. 6 shows DMIPC chromatograms demonstrating mutation detection using the procedures of blind target zone elution.

The "blind collected" mobile phase described hereinabove preferably is concentrated, e.g., by evaporation of the mobile phase. If a mutation was present in the original sample, the residue will now be enriched in the heteroduplex. This heteroduplex enriched residue is amplified again by PCR and the products are hybridized. The hybridized products of the second PCR amplification will now contain an increased amount of heteroduplex relative to homoduplex. A chromatogram showing the results of this process is depicted in FIG. 6. The evaporation can be effected with standard and conventional DNA solution evaporation equipment, for example, the SPEEDVAC evaporator (Model UCS 100 Universal Speed Vac system, Savant Instruments, Inc, Hayward, Calif.).

The collected fragments can be amplified by conventional PCR or cloning and further analyzed by sequencing and restriction digestion. The cycle of separation and amplification can be repeated, if needed, to increase the amount of a desired fraction available for subsequent analysis.

The steps comprising the method of the invention were designed to enrich the sample in heteroduplex in order to enable the detection of mutations which would normally go undetected. The steps of the method of the invention can be reiterated a plurality of times to increase the purity and quantity of heteroduplex to any desired level. The increased amount of heteroduplex compared to homoduplex obtained in this manner can be described by an "enhancement factor". The "enhancement factor" is defined herein as the increase in the ratio of heteroduplex to homoduplex compared to the ratio of heteroduplex to homoduplex in the original hybridized sample, wherein the increase results from the implementation of the method of the invention. The "enhancement factor" depends on the number of iterations performed and can range from 10 to more than 1,000.

After the final iteration, the PCR product is hybridized and analyzed by DMIPC. If the original sample contained a mutation, the concentration of heteroduplex or its concentration relative to wild type, will now be sufficient to detect. The DMIPC chromatogram will, therefore, show a peak having the retention time of the standard heteroduplex. In this event it can be concluded unambiguously that a mutation was present in the original sample.

As a further confirmation of the identity of the mutation, an aliquot of standard heteroduplex can be mixed with an aliquot of the heteroduplex enriched sample. A DMIPC chromatogram of this mixture will show an increase in the area of the heteroduplex peak, compared to the area of the heteroduplex enriched sample peak alone.

Additionally, the purification and enrichment method described above will provide sufficient heteroduplex for determination of its base pair sequence. Sequencing will provide further confirmation of the identity of the mutation.

If, after performing a plurality of iterations according to the method of the invention as described above no heteroduplex peak is seen in the DMIPC chromatogram, then it can be safely concluded that the original sample did not contain a mutation.

Denaturing gradient gel electrophoresis techniques which can separate homoduplexes from heteroduplexes cannot be used as an alternative to DMIPC. Although samples can be recovered from gels with difficulty, blind collection is not possible because the mobility of a DNA fragment in a gel is not constant. Therefore, its position cannot be reliably predicted. In addition, the shape of DNA fragment bands in gels are often irregular, further complicating sample recovery and making detection uncertain. An additional problem is the fact that gels take many hours to develop, making it impractical for routine use.

On the other hand, the highly predictable nature of the retention times determined from DMIPC separations makes this method uniquely suited to mutation detection if blind collection is required. The use of DMIPC for the purpose of mutation detection as described in this application has not been previously reported.

Other features of the invention will become apparent in the course of the following descriptions of exemplary embodiments which are given for illustration of the invention and are not intended to be limiting thereof.

FIG. 7 is a cross-sectional view of a spin vial separation device of this invention. This system uses a standard laboratory centrifuge to rapidly pass liquids through the separation media. The system uses a standard cylindrical centrifuge vial or eluant container 142 into which a separator tube or cylinder 144 is inserted. The separator cylinder can have a cylindrical body 146, open at top end 148 and bottom end 150, and sized to fit within the vial 142. The upper end 148 has an outwardly extending upper flange 152 which is sized to rest on the upper rim 154 of the cylindrical vial 142. The lower end 150 has an inwardly extending lower flange 156 which is sized to support the separation unit 158.

The separation unit comprises a porous support disk 160 which rests on flange 156, an optional outer cylinder 162 within which the separation media 164 is positioned. The separation unit can also comprise an optional upper porous disk 166 to prevent disruption of the separation media and an optional ring 168. The optional ring 168 preferably has a slightly elastic or yielding composition and an outer diameter which is sized to establish a frictional engagement with the inner wall of cylinder 146. The ring 168, when pressed against the disk 166, holds the disk in place during use of the column.

The separation media is a unique aspect of this invention. The surfaces of the media must be nonpolar surface and must be free of any traces of metal contaminants such as multivalent metal ions. The media can be in the form of beads; monoliths; a bundle of capillary tubing or an object with parallel capillary passageways having one set of ends open to the upper separation chamber 170 and the other set of ends open to the lower separation chamber 172. The media surfaces can be porous or nonporous. However, to effect rapid and precise separations, nonporous media surfaces are preferred. Examples of porous media are described in copending, commonly assigned U.S. patent application Ser. No. 09/081,039 filed May 18, 1998. Examples of the preferred nonporous media are described in copending, commonly assigned U.S. patent applications Ser. No. 09/183,123 filed Oct. 30, 1998 and Ser. No. 09/183,450 filed Oct. 30, 1998.

These separation media can be beads or other structures described above. The preferred separation media are beads which are made of nonpolar materials such as the organic polymers described in U.S. patent applications Ser. No. 09/183,123 or inorganic polymer beads which have been treated to end-block or coat their polar groups. The optimum beads are organic polymer beads such as styrene-divinyl benzene polymer beads which can have optional alkyl substitutions described in U.S. patent applications Ser. No. 09/183,123.

The beads are preferably made from polymers, including mono- and divinyl substituted aromatic compounds such as styrene, substituted styrenes, alpha-substituted styrenes and divinylbenzene; acrylates and methacrylates; polyolefins such as polypropylene and polyethylene; polyesters; polyurethanes; polyamides; polycarbonates; and substituted polymers including fluorosubstituted ethylenes commonly known under the trademark TEFLON. The base polymer can also be mixtures of polymers, non-limiting examples of which include poly(styrene-divinylbenzene) and poly (ethylvinylbenzene-divinylbenzene). The polymer can be unsubstituted, or substituted with a hydrocarbon such as an alkyl group having from 1 to 1,000,000 carbons. In a preferred embodiment, the hydrocarbon is an alkyl group having from 1 to 24 carbons. In more preferred embodiment, the alkyl group has 1–8 carbons.

The separation media surfaces must be free from multivalent metal cations in order to obtain the most effective separations.

The separations of materials using the device of FIG. 7 are demonstrated in the Examples presented hereinbelow. In general, they are achieved by the following sequence of steps.

1. The mixture of a double-stranded oligonucleotides, double-stranded DNA fragments, single-stranded DNA fragments, RNA, plasmids or the like to be separated is diluted in an aqueous solution containing a counterion and a low concentration of driving solvent.

2. The diluted mixture is placed in the chamber 170 and the separation device with the liquid is placed in a standard laboratory centrifuge and spun until all of the free liquid has passed into the chamber 172. The inner cylinder 144 is removed from the vial, and the contents of chamber 172 are discarded. The materials to be separated bind to the separation media in this step.

3. A second aqueous solution containing counterion and a second higher concentration of driving solvent is prepared and placed in the chamber 170. The driving solvent concentration is calculated to be the amount which will remove all undesired smaller size materials from the separation media. The precise concentration of driving solvent is determined from a standard table or curve, or it can be calculated, using values determined in a calibration of the media made using a double-stranded DNA (dsDNA) ladder or standardized enzyme digest.

4. The separation device is spun in a centrifuge until all of the free second solution has passed into the chamber 172. The inner cylinder 144 is removed from the vial, and the contents of chamber 172 are removed. This step removes from the separation media contaminants and smaller size fragments.

5. A third aqueous solution containing counterion and a third higher concentration of driving solvent is prepared and placed in the chamber 170. The third higher concentration of driving solvent concentration is calculated to be the amount which will remove a desired larger-sized material from the separation media. The precise concentration of driving solvent is determined from a standard table or curve, or it can be calculated, using values determined in a calibration of the media made using a doublestranded DNA (dsDNA) ladder or standardized enzyme digest.

6. The separation device is spun in a centrifuge until all of the free third solution has passed into the chamber 172. The inner cylinder 144 is removed from the vial, and the contents of chamber 172, containing the desired larger-sized fraction or fractions, are removed for further processing. This step removes from the separation media the desired materials.

Obviously, the vial 142 can be replaced between steps or cleaned between steps to prevent contamination of the product fraction or fractions.

The concentration of driving solvent in the third solution can be selected to remove a single fragment size or a range of fragment sizes.

Steps (5) and (6) can be repeated with successive greater concentrations of solvent to remove a series of successively increasing fragment sizes.

It will be readily apparent to a person skilled in the art that other variations can be applied to remove a series of purified fractions in much the same manner as is shown above and illustrated in the Examples and Figures of this application.

Examples of suitable organic driving solvents include alcohol, nitrile, dimethylformamide, tetrahydrofuran, ester, ether, and mixtures of one or more thereof, e.g., methanol, ethanol, 2-propanol, 1-propanol, tetrahydrofuran, ethyl acetate, acetonitrile. The most preferred organic solvent is acetonitrile. The counterion agent is preferably selected from the group consisting of lower alkyl primary amine, lower alkyl secondary amine, lower alkyl tertiary amine, lower trialkyammonium salt, quaternary ammonium salt, and mixtures of one or more thereof. Non-limiting examples of counterion agents include octylammonium acetate, octadimethylammonium acetate, decylammonium acetate, octadecylammonium acetate, pyridiniumammonium acetate, cyclohexylammonium acetate, diethylammonium acetate, propylethylammonium acetate, propyidiethylammonium acetate, butylethylammonium acetate, methylhexylammonium acetate, tetramethylammonium acetate, tetrapropylammonium acetate, tetrabutylammonium acetate, dimethydiethylammonium acetate, triethylammonium acetate, tripropylammonium acetate, tributylammonium acetate, tetraethylammonium acetate, tetrapropylammonium acetate, tetrabutylammonium acetate, and mixtures of any one or more of the above.

Examples of suitable counterion agents include an anion, e.g., acetate, carbonate, bicarbonate, phosphate, sulfate, nitrate, propionate, formate, chloride, perchlorate, or bromide. The most preferred counterion agent is triethylammonium acetate or triethylammonium hexafluoroisopropyl alcohol.

Figure 8:
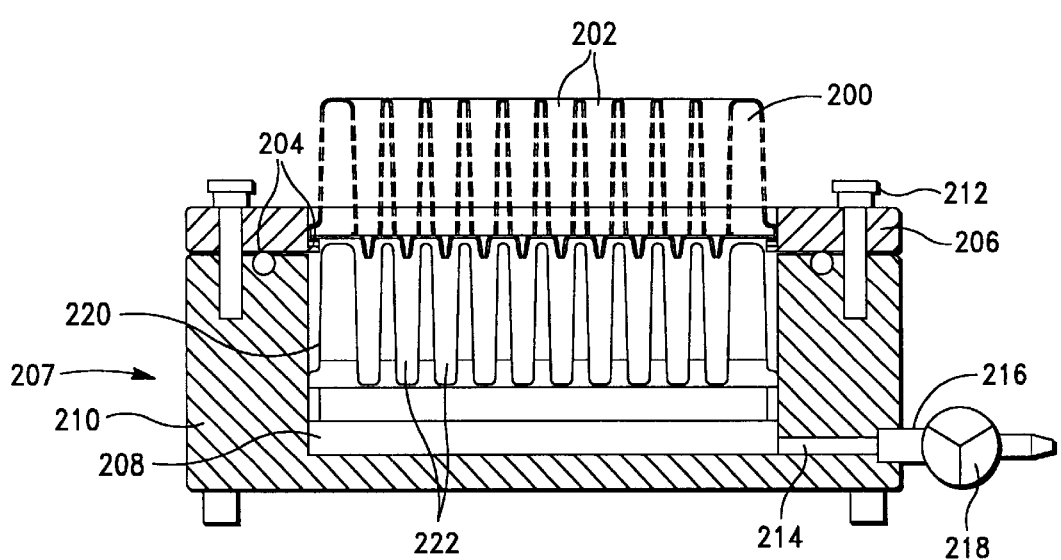
FIG. 8 is a multiwell plate separation system of this invention in combination with a vacuum attachment.
Figure 9:
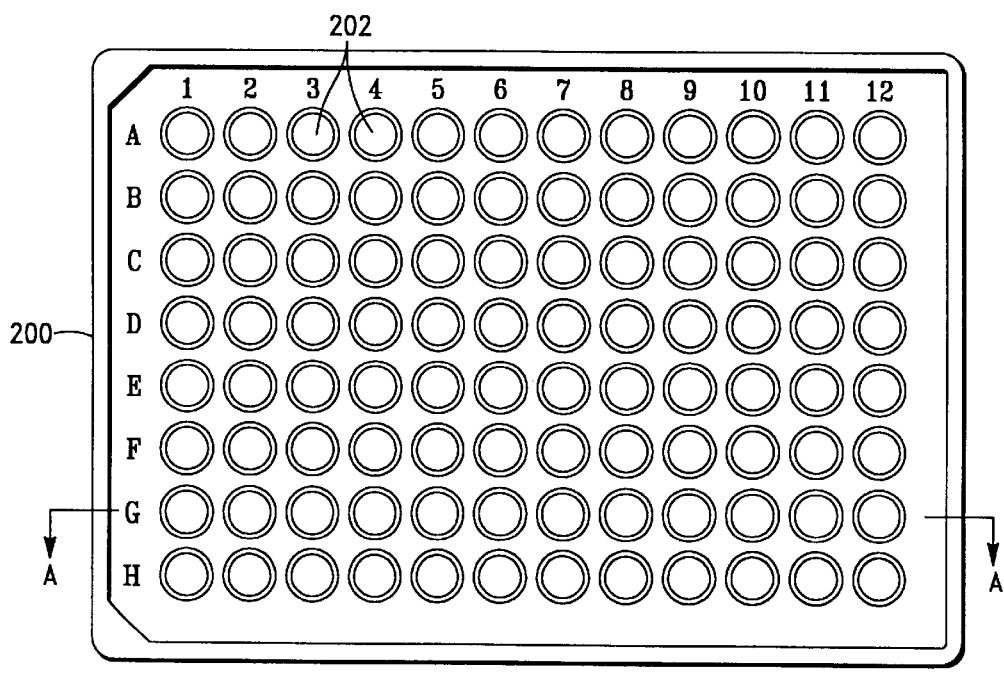
FIG. 9 is the top view of a multiwell plate of FIG. 8.

FIG. 8 is a cross-sectional view of a vacuum tray separation device of this invention, and FIG. 9 is a top view of the separation tray of FIG. 8. The separator tray 200 is a single plate with rows and columns of tubular separation channels 202, preferably having regular, repeated spacings between the rows and columns for indexing the spacings. The dimensions of the tray 200 and separation channels can correspond and match the dimensions of standard multiwell plates such as the 96 cavity microtiter plate.

The multi-channel plate 200 is supported on support flange and vacuum seals 204 formed in the internal cavity of an upper plate 206 of the vacuum assembly 207. The vacuum assembly 207 further comprises a vacuum cavity 208 defined by housing 210. The upper plate 206 positioned on the housing 210 by locating pins 212, and the upper plate 206 and the housing 210 have a sealed engagement with the seals 204. The housing 210 has an exhaust outlet channel 214 communicating with the vacuum chamber 208 and with a vacuum conduit 216 and vacuum valve 218. The vacuum conduit 216 and vacuum valve 218 communicate with a vacuum source (not shown).

A multiwell collection plate 220 is supported in the vacuum chamber 208. The multiwell collection plate 220 is a single plate with rows and columns of separation channels 222, preferably having regular, repeated spacings between the rows and columns for indexing the spacings. The dimensions of the tray 220 and collection channels can correspond and match the dimensions of standard multiwell plates such as the 96 cavity microtiter plate. The collection plate 220 is held in a position which aligns each of the collection wells 222 with a corresponding separating channel 202 of the separation plate 200 so each well 222 can collect liquid falling from the corresponding separation channel 202.

Figure 10:
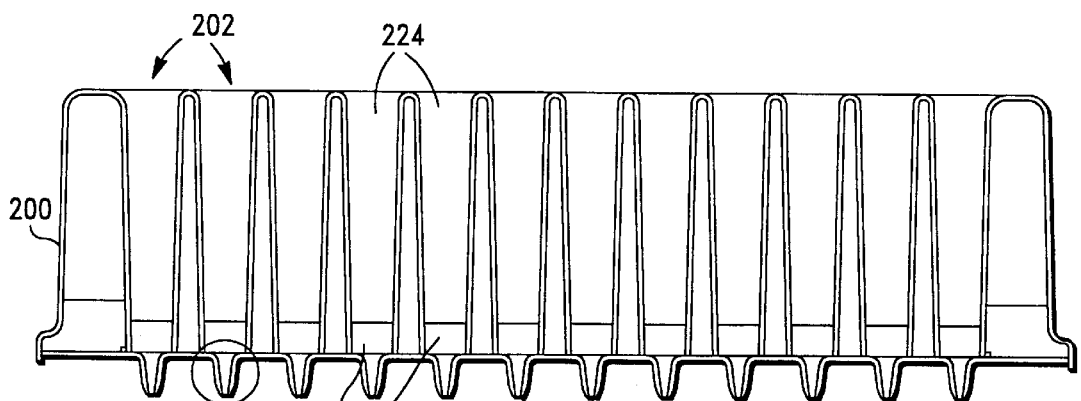
FIG. 10 is a cross-sectional view of the separation tray of FIG. 8 taken along the line A—A.

FIG. 10 is a cross-sectional view of the separation tray of FIG. 9 taken along the line A—A. The separation channels 202 each have an evenly spaced upper cavity 224, separation media 226 and a liquid outlet 228.

Figure 11:
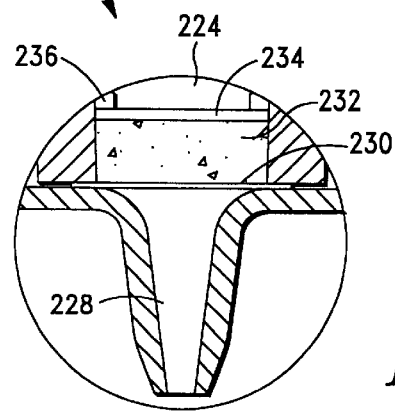
FIG. 11 is an enlarged view of a single separation cell of the multiwell plate of FIG. 10.
Figure 12:
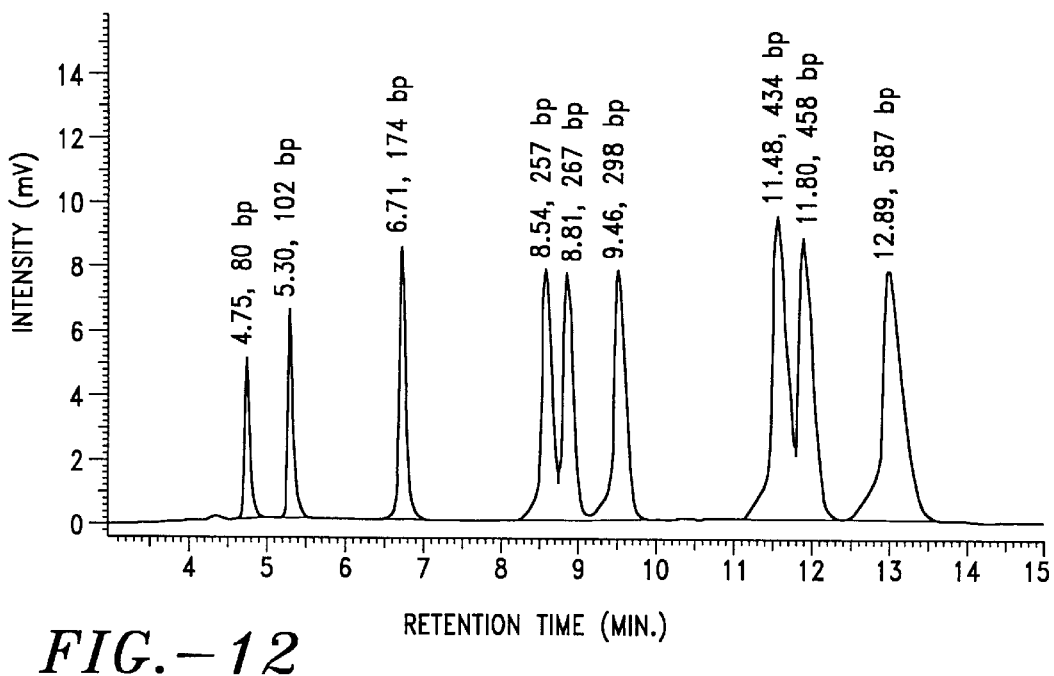
FIG. 12 is a chromatogram of the unseparated mixture of DNA fragments in the procedure of Example 1.
Figure 13:
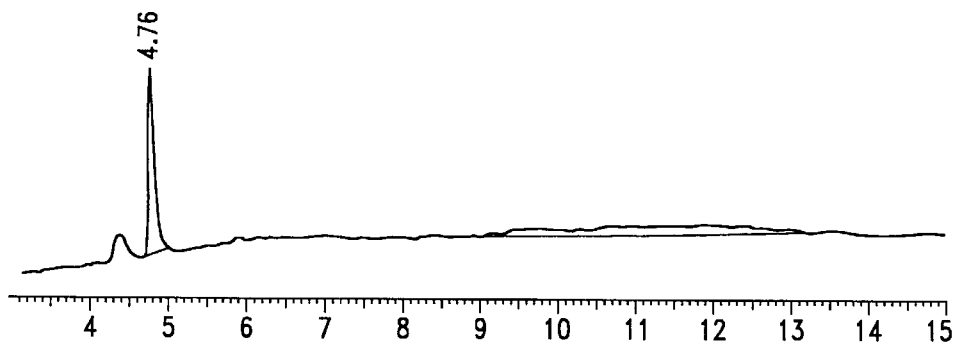
FIG. 13 is a chromatogram of the separated 80 bp fragment obtained in the procedure of Example 1.
Figure 14:
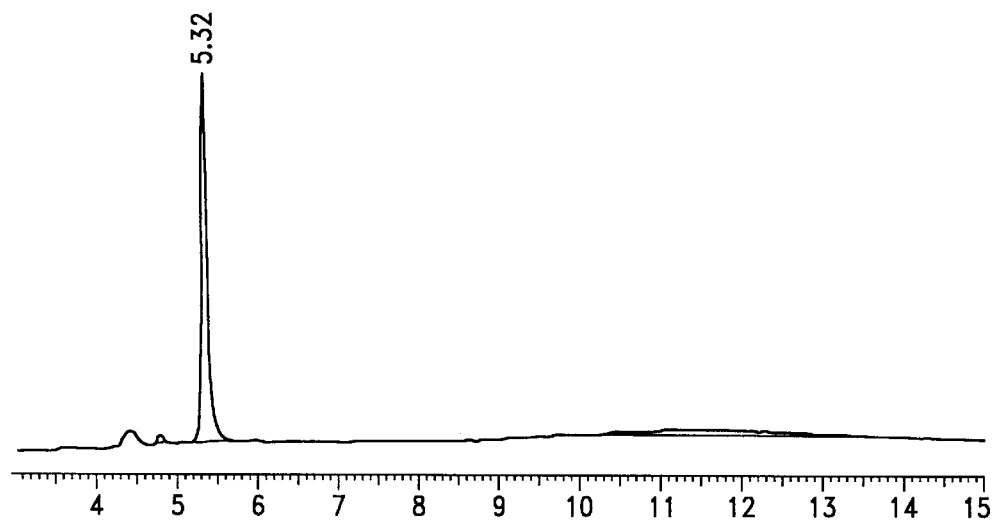
FIG. 14 is a chromatogram of the separated 102 bp fragment obtained in the procedure of Example 1.
Figure 15:
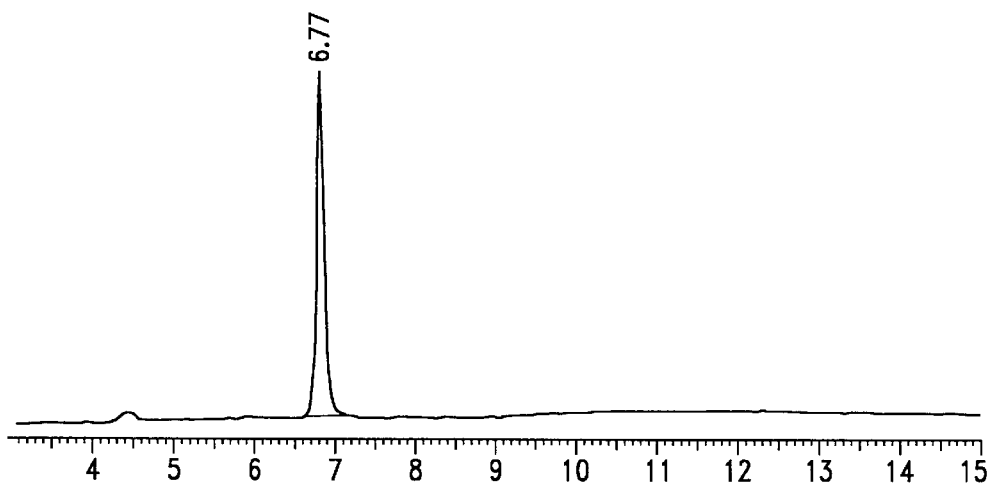
FIG. 15 is a chromatogram of the separated 174 bp fragment obtained in the procedure of Example 1.
Figure 16:
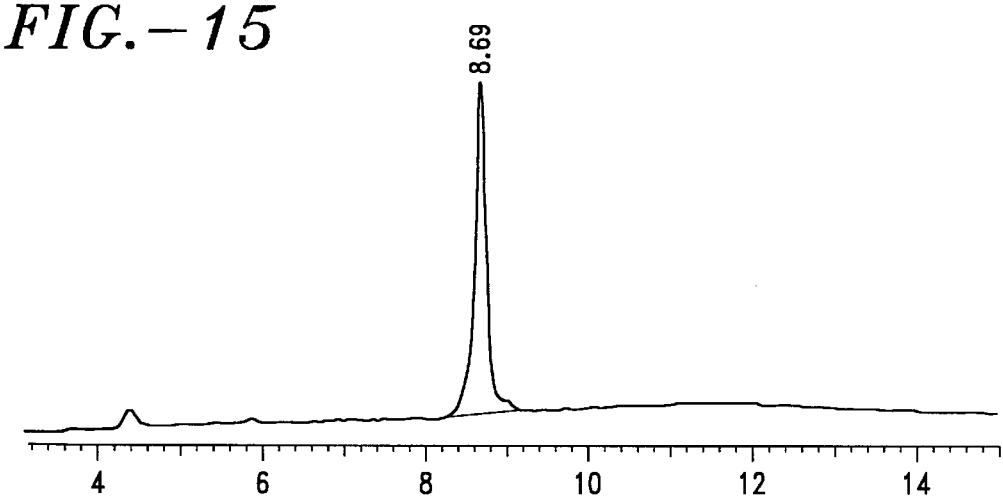
FIG. 16 is a chromatogram of the separated 257 bp fragment obtained in the procedure of Example 1.
Figure 17:
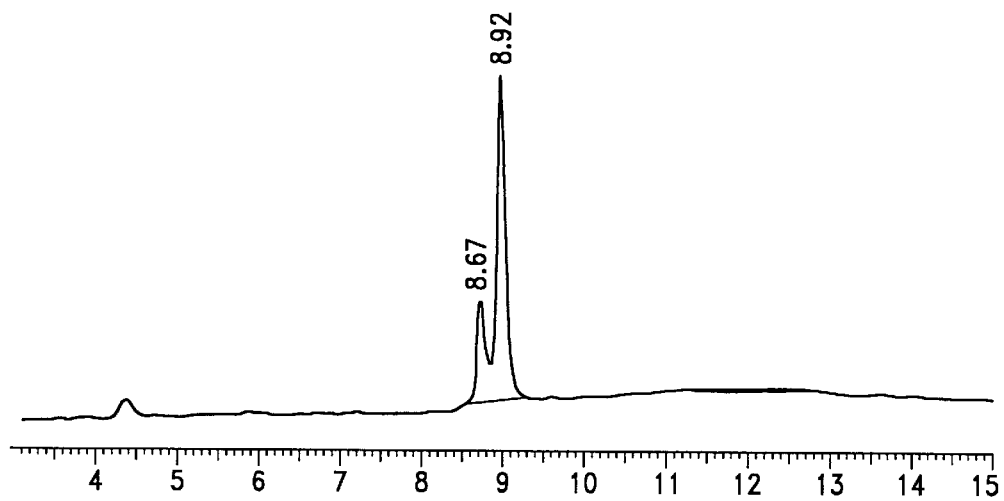
FIG. 17 is a chromatogram of the separated 267 bp fragment obtained in the procedure of Example 1.
Figure 18:
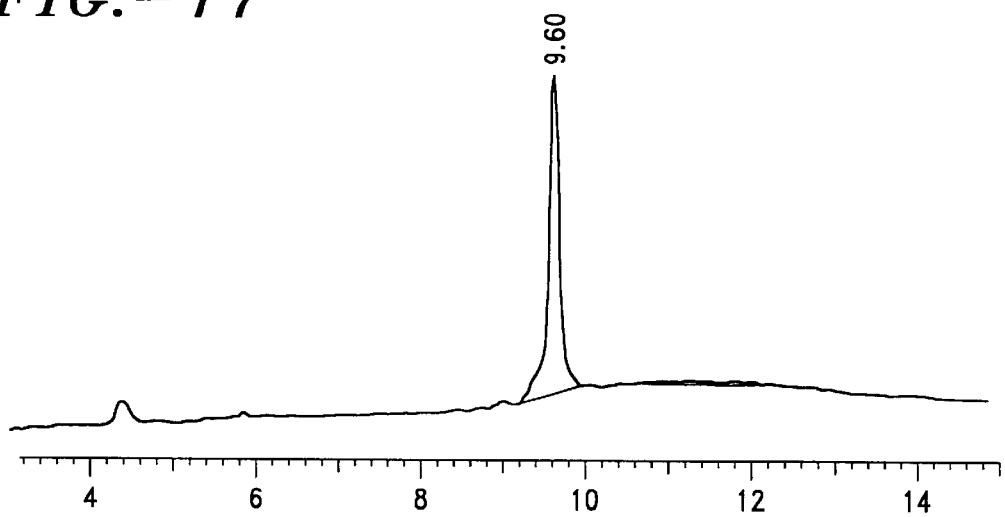
FIG. 18 is a chromatogram of the separated 298 bp fragment obtained in the procedure of Example 1.
Figure 19:
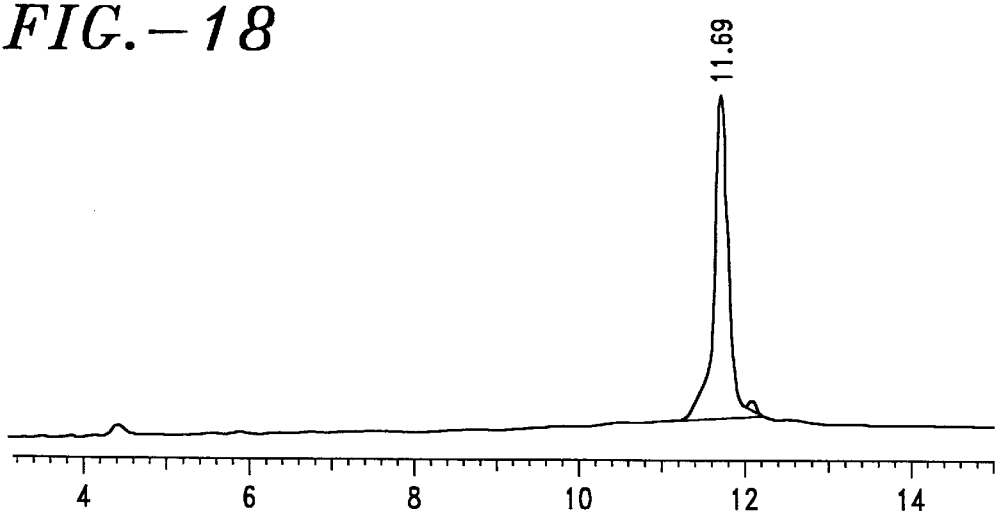
FIG. 19 is a chromatogram of the separated 434 bp fragment obtained in the procedure of Example 1.

FIG. 11 is an enlarged view of the separation components of the separation tray of FIG. 10. The bottom of the separation cavity 224 supports a porous disk 230, which in turn supports separation media 232. An optional containment disk 234 rests on the separation media 232, and the containment disk 234 can be optionally held in place by friction ring 236 or an equivalent device.

The separation media 232 can be the same nonpolar media as described above with respect to media 122 in FIG. 3.

The separation vial components 142 and 146 of FIG. 7 and the plates 200 and 220 in FIGS. 8–11 are made of a material which does not interfere with the separation process such as polystyrene, polypropylene, or polycarbonate. The upper plate 206 and housing 210 can be made of any materials having the requisite strength such as a rigid organic polymer, aluminum, stainless steel or the like. The vacuum chamber walls are preferably coated with Teflon film. The vacuum conduit and valve can also be made of Teflon coated aluminum or the like.

The separations of materials using the device of FIGS. 8–11 are achieved by the following sequence of steps.

1) A mixture of double-stranded oligonucleotides, single-stranded DNA fragments, single-stranded DNA fragments, RNA, plasmids or the like containing a component to be separated from the mixture to be separated is diluted in an aqueous solution containing a counterion and a low concentration of driving solvent.

2) The diluted mixture is placed in one of the chambers 202 of the fully assembled vacuum device. The other chambers 202 are filled with other mixtures to be separated by the same procedure.

3) Vacuum is applied to the vacuum chamber 208 by opening vacuum valve 218 until all of the liquid from the mixtures contained in each chamber has collected in chambers 222. The vacuum device is disassembled, and the contents of chambers 222 are discarded. The materials to be separated bind to the separation media 232 in each chamber 202 in this step.

4) The vacuum apparatus and plates are reassembled, and a second aqueous solution containing counterion and a second higher concentration of driving solvent is prepared and placed in the chambers 202. The driving solvent concentration is calculated to be the amount which will remove all lower molecular weight material from the separation media. The precise concentration of driving solvent is determined from a standard table or curve, or it can be calculated, using values determined in a calibration of the media made using a double-stranded DNA (dsDNA) ladder or standardized enzyme digest.

5) Vacuum is applied to the vacuum chamber 208 by opening vacuum valve 218 until all of the liquid from the mixtures contained in each chamber has collected in chambers 222. The vacuum device is disassembled, and the contents of chambers 222 are removed. The lower molecular weight and smaller size materials are removed from the column and collected, and the larger base-pair length materials remain on the separation media 232 in this step.

6) The vacuum apparatus and plates are reassembled, and a third aqueous solution containing counterion and a second higher concentration of driving solvent is prepared and placed in the chambers 202. The driving solvent concentration is calculated to be the amount which will remove a desired larger-sized material or materials from the separation media. The precise concentration of driving solvent is determined from a standard table or curve, or it can be calculated, using values determined in a calibration of the media made using a double-stranded DNA (dsDNA) ladder or standardized enzyme digest.

7) Vacuum is applied to the vacuum chamber 208 by opening vacuum valve 218 until the liquid from the mixtures contained in each chamber has collected in chambers 222. The vacuum device is disassembled, and the contents of chambers 222 are removed. The larger-sized materials are removed from the chambers and collected.

The concentration of driving solvent in the third solution can be selected to remove a single fragment size or a range of fragment sizes. This procedure can be elaborated by choosing a driving solvent concentration in the third aqueous solution which removes all materials below a target size and following it with a repeated sequence with a driving solvent concentration which will remove the specific size materials of the target size.

Obviously, the plate 220 can be replaced between steps or cleaned between steps to prevent contamination of the product fraction or fractions.

These steps can be repeated with successive greater concentrations of solvent to remove a series of successively increasing fragment sizes.

It will be readily apparent to a person skilled in the art that other variations can be applied to remove a series of purified fractions in much the same manner as is shown above and illustrated in the Examples and Figures of this application.

MIPC is uniquely suited to the process of nucleic acid purification, whether the fragments are tagged or untagged by exogenous moieties (i.e. fluorescent dyes, biotin, etc.). By applying MIPC conditions that isolate fragments on the basis of size, sequence, or both, the highest possible purity is obtained for nucleic acids. This level of performance is achieved through tight control over chemical/eluent conditions, as well as using appropriate matrix materials. With separations made with the devices and methods of this invention, DNA fragments can be produced which are more suitable for cloning than can be obtained by gel electrophoresis, for example, Hecker, Karl H. et al, "Optimization of cloning efficacy by pre-cloning DNA fragment analysis", *Biotechniques*, 26(6):216–222 (February, 1999).

Since MIPC is a chemical process, nucleic acid purifications can be achieved at any pressure. This is especially valuable for size-based purification of PCR products and restriction digests at ambient pressure as shown in the Examples 3 and 4, and FIGS. 22–27 presented hereinafter.

It is equally valuable for size-based (Marino, et al, *Electrophoresis*, 1998, 19, 108–118) and sequence based purification of PCR products at high pressure prior to sequencing as shown in Example 1, and FIGS. 12–21 hereinbelow. It can also be applied for size-based purification of plasmid restriction digests prior to cloning. See U.S. Provisional Application Serial No. 60/130,700 filed Apr. 23, 1999, incorporated herein in its entirety.

The general process of obtaining purified nucleic acids are independent of pressure conditions. Whether operating at high or low pressures, purification is characterized by the following processes:

1. Trapping the nucleic acid(s) of interest on the DNA Chromatography matrix under appropriate DNA Chromatography conditions.

2. Exposing the trapped nucleic acid(s) to chemical and/or thermal conditions which quantitatively release those components selected for removal.

3. Collecting the removed components of interest for later use (optional).

4. Detecting the removed components (optional).

5. Exposing the remaining trapped nucleic acid(s) to chemical and/or thermal conditions which quantitatively release the remaining nucleic acid(s).

6. Collecting the released nucleic acid(s) of interest (optional).

7. Detecting the released nucleic acid(s) of interest (optional).

The following are examples of the application of DNA Chromatography for nucleic acid purification:

It is known that current technologies used for PCR purification have significant problems. One of the single biggest problems with this application for current technology is the incomplete removal of primers, primer dimers or other non-specific amplification products. Through competition, these "background" components confound many downstream molecular biology tasks (such as sequencing and cloning, just to name a couple). As one example, these problems are particularly exasperating in sequencing when using the industry-standard approach of dye-labeled terminators in cycle sequencing. When using dye-labeled terminators, the purification of PCR-generated templates must provide exceptionally high template recoveries and template purity. This means there must be complete removal of potentially interfering contaminants (amplification primers and primer dimers, non-specific amplification products, dNTPs, Taq) which doesn't always occur with current silica-based technology.

Other downstream problems also occur when cloning is being performed, as it can lead to the cloning of undesired fragments. These cloning problems are outlined in Hecker, Karl H. et al, supra, the entire contents of which are incorporated by reference.

The purification approach taken by major producers of PCR cleanup technology is based upon the adsorption of nucleic acids (ssDNA, dsDNA, RNA) to silica gel. Once the silica gel is treated with a high-salt solution, the nucleic acids adsorb to the silica gel via an exchange mechanism. The nucleic acids are then desorbed by applying a low-salt eluent. This works very well for clean DNA, but has problems with other components. The chemical processes occurring on the silica gel surface are not tightly controlled, so one is dependent upon radical changes occurring evenly across the particle surface. The lack of efficient primer, primer dimer and non-specific amplification product removal is well known. Example 5 illustrates removal of PCR byproducts. Furthermore, the (typically) porous surface of the silica gel can trap those contaminants that most require removal.

The materials used currently in the MIPC column matrix of this invention, as well as other materials suitable for MIPC (as one example, larger polymeric particle sizes of nonporous reverse-phase materials), are known to have an exceptionally high capacity and selectivity for long-chain nucleic acids. By applying a suitable pairing ion, and then changing nothing other than the acetonitrile concentration (or any other suitable solvent, such as an alcohol), the quantitative adsorption/desorption of varying lengths of short- and long-chain nucleic acids are essentially turned on and off. Furthermore, since the matrix is made of a nonporous polymeric material, there is no opportunity for interlopers (dNTPs, primers, primer dimers, non-specific amplification products) to get trapped and become problematic downstream. In essence, the matrix materials we possess (nonporous polystyrene-divinylbenzene, either unalkylated or alkylated) are perfectly suited to the purification of PCR products prior to the most demanding molecular biology applications. Also suitable are nonporous polymeric or modified silica materials which has been manufactured or purified in a manner which produces surfaces which are free of contamination. These can be in the form of beads, monoliths, channels, capillary or planar surfaces. The polymeric surfaces can be provided by non-alkylated and alkylated materials including polystyrene, divinylbenzene, hydroxyethylmethacrylate, and other nonionic polymers. Polymers having a negative charge may also be used provided the charged groups are protonated to produce a neutral surface, i.e., carboxylic acid. An example of this is illustrated by Example 1. When trying to do size-based cloning from a pool of fragments (cDNA fragment pools, fragment pools from restriction digestion of plasmids/artificial chromosomes/genomic DNA, etc), the efficiency of fragment ligation into the vector (and hence cloning efficiency) is biased towards smaller fragments. As an extension of the identical principles applied for purification of PCR products, one can perform fractionations of fragment pools on the kits. By applying gradually increasing concentrations of acetonitrile and analyzing the collected fractions with a suitable 260/280 detector, an extremely rapid process is created that effectively replaces smearing the fragment pools out on a gel and slicing the size range of interest out with a razor blade. This general process has been shown for high-pressure sizing of fragments prior to cloning, and will translate directly into low-pressure formats.

It is known that many silica-based and anion exchange-based purification kits for clones (this is particularly true for mini-preps of $\leq 20$ $\mu$g plasmid) have difficulty with purifications from TB (terrific broth), due to the higher copy number of plasmids present (relative to LB broth). We know that DNA Chromatograpy matrices have higher capacities than typical silica-gel-based preps (i.e. QiaGen miniprep). Furthermore, it is highly likely that since our separation mechanism is akin to anion exchange, DNA Chromatography-derived purities will match or exceed the purities of competitor's premier (and significantly more expensive) "ultra-high-purity" anion exchange product, thus representing significant cost savings at the same time. The following is a protocol for this procedure.

First, Plasmid DNA is released from *E. Coli* (or, ssDNA from M13 phage). Alkaline lysis of *E. Coli* is a classic first step for the isolation of plasmids from *E. Coli*. To achieve this, the cells are centrifuged to separate them from the supernatant/growth medium (either Luria-Bertani (aka LB) or terrific broth (aka TB) medium). Once pelleted, the cells are resuspended (often with glucose/EDTA/Tris, aka GET) and then lysed with NaOH/SDS. This must be done gently, so as to not introduce smaller pieces of sheared chromosomal DNA. The resultant solution should be fairly clear and viscous. This solution is neutralized with an appropriate buffer (often potassium acetate), thus generating a white precipitate which contains cellular debris, SDS, chromosomal DNA, and some proteins. The plasmid DNA (along with various soluble lipids, various proteins, carbohydrates, salts, RNA) remains in solution. The lysate solution is typically clarified via centrifugation. This clarified lysate, which contains the plasmid or ssDNA, is then introduced to the DNA Chromatography matrix.

Once introduced to the matrix, a wash procedure will take place. This would likely be a TEAA solution with a higher concentration of acetonitrile (i.e. 15% acetonitrile). This should remove even the most hydrophobic contaminants, and leave the plasmid intact on the resin. Once washed with this solution, the plasmid would be eluted with a minimum amount of eluting buffer (25% acetonitrile, higher for larger plasmids). In the case of ssDNA from M13 phage, it may be necessary to go to a different alkyl ammonium ion-pairing reagent so that size-based separation is maintained. The collected plasmids/M13 phage (as an option, the solvents can be removed via evaporation) are then available for any downstream application.

These are extremely large DNA constructs (typically >100 kb) which often must be purified for a number of reasons (sequencing, sub-cloning, etc). Note that there are a vast number of procedures available for the release of these constructs from their respective mediums (i.e. bacteria, yeast, other cells). In any event, once the constructs are present in a clarified lysate medium (much like plasmids and M13 phage, above), they must have a suitable quantity of ion-pairing reagent added to them so they can trap onto the DNA Chromatography matrix. Once trapped, a wash solution with an appropriate concentration of organic solvent (acetonitrile, alcohol, etc) is applied to remove contaminating species, leaving the larger DNA constructs on the matrix. Since these constructs are quite large, they will likely require a fairly high concentration of acetonitrile (or other suitable solvent) to release them from the matrix. Once they are collected (as an option, the solvents can be removed via evaporation) the constructs are available for any downstream application.

MIPC is well suited to purification of oligonucleotides and longer probes, both of which are ssDNA constructs. Oligonucleotides and probes (either labeled or unlabeled) require quality control and/or purification prior to use—either directly after in-house synthesis, but also in cases where they are ordered from external suppliers (and are assumed to have gone through these special purification measures). It is possible to perform these purifications in a high-pressure format, as is demonstrated in detail in Example 1 and Example 6.

It is also possible to perform these analyses in a low-pressure format as well. As in the case of the nucleic acids mentioned above, the ssDNA constructs are combined with a suitable concentration of an appropriate ion-pairing reagent that allows size-based discrimination of the DNA.

A standard means of performing genotyping involves the use of primer extension. An oligonucleotide is annealed which flanks the 5' region of interest on a template. Nucleotides are added in standard proportions, except for one of them being a terminating dideoxynucleotide (ddNTP). An appropriate high-fidelity polymerase, such as Pfu, is added and the nucleotides are added on to the template, effectively extending the primer to the point where the ddNTP is incorporated, thus halting the primer extension process. The length of the resultant extension product thus indicates the identity of the base where extension terminated. This extension may only occur for one base, or it may go on until the base complementary to the terminator is encountered. In any event, it is possible to then denature the extended primer from the template, and then size the extended primer to determine an accurate genotype for the template.

In the context of DNA Chromatography, it is possible to use temperature (>75 C) to completely denature the extended primer from its template. Upon introduction to the pre-heated matrix, the (ion-paired) template and (ion-paired) extended primer will remain adsorbed on the surface until a suitable concentration of organic solvent (acetonitrile, alcohol, etc) is introduced that selectively desorbs only the (significantly shorter) primers and primer extension products (possibly for collection), thus leaving the original template behind on the matrix. This is an example where smaller products are collected first, and larger (unnecessary) products are left behind.

Once the primer extension products are selectively released, they can be sized directly on the DNA Chromatography matrix (Hoogendoorn, B., et al "Genotyping single nucleotide polymorphisms by primer extension and high performance liquid chromatography", *Human Genetics*, 1999, Vol. 104, No. 1, pp. 89–93. If the purified primer extension products are collected, they can also be sized by other means such as gel electrophoresis or mass spectrometry.

When the purification procedures noted above are applied, it is possible to detect the purified products either by UV absorbance, or by fluorescent intensity. In the case of high- or moderate-pressure purifications occurring in a conventional liquid chromatography format, this detection occurs on-line with a suitable detector (this has been described in detail in other documents). When these processes occur in a low-pressure format, it is also possible to detect the purified products in an on-line format. However, a straightforward means of detecting the purified products is in an off-line format (either in a cuvette-based system, or by a suitably designed well-plate reader).

Independent of the detection means described above, when the nucleic acids are discretely detection after purification, a replacement for gel-based purifications has been effected. As an illustration of this concept, an example is given below for the detection of (low-pressure) purified PCR products prior to dye-terminator sequencing.

When a PCR product has been purified and collected into an appropriate well-plate, it will require spectral analysis. The reasons for this are two-fold: successful DNA sequencing (particularly dye terminator cycle sequencing) requires a fair amount of control over the amount of DNA introduced for sequencing; the amount of protein impurities must be measured, to ensure there are no competing enzymatic reactions. To achieve these measurements, the purified DNA must be measured via absorbance at 260 nm (for DNA measurement) and at 280 nm (for protein measurement). This can be done by collecting the eluted DNA in a UV-transparent well-plate. Note that we must ensure the absence of photometric "crosstalk" between the wells, and that path lengths are "adjustable" to reflect different eluant volumes. The spectrophotometric requirements at each wavelength are very important. When operating at maximum DNA capacity, 10 ug DNA/50 uL=200 ng/uL; when operating under typical conditions: ~1 ug/50 uL=40 ng/uL. One can assume A nominal path length of 0.2 cm (50 $\mu$L in polyfiltronics' UVMAX plate). Absorbance of 1.0 at 260 nm (A260=1)≡50 ng/uL DNA, with 1.0 cm path length ∴ A260=0.2 for 50 ng/uL DNA in a 0.20 cm path length. If the conditions noted above are the case, then the following absorbance scale (minus background) must be achievable with the A260 measurements at a 0.20 cm path length:

Capacity (10 $\mu$g DNA/50 $\mu$L=200 ng/$\mu$L): A260=0.8
Typical (1 $\mu$g DNA/50 82 L=20 ng/$\mu$L): A260=0.08
Low End (50 ng DNA/50 $\mu$L=1 ng/$\mu$L): A260=0.004

For the purposes of protein "quantitation" and measuring DNA purity, it will be necessary to take measurements at 280 nm. Ratios of the A260/A280 measurements will be used for this task. Using the absorbance scale above as a guide, and knowledge that A260/A280 ratios must be above 1.8 for typical sequencing reactions, the following must be achievable at 280 nm.

Capacity (200 ng/$\mu$L): A280=0.440
Typical (20 ng/$\mu$L): A280=0.044
Low End (1 ng/$\mu$L) A280=0.0022

There are many procedures within molecular biology that require the complementary (or, near complimentary) hybridization of a probe (or probes) to a test strand (or strands) of DNA or RNA. Once the probe (or probes) have been hybridized, the hybridization event is then detected by a number of means. To detect the hybridization event, it is possible to examine the signal from a reporting moiety attached to the probe (radioactive probes, fluorescent probes, etc), to examine a mobility shift in a gel electrophoresis experiment, or the like.

It is also possible to detect hybridization events directly by use of DNA Chromatography. Once a probing event has occurred, and any other steps are taken afterwards (i.e. extension of an annealed primer, displacement of the probe for analysis, etc), the resultant single-stranded structure (which will be smaller than the template it is interrogating) can be denatured directly from the template and detected either on-line (i.e. UV absorbance, fluorescence, mass spectrometry) or in an off-line manner (i.e. MALDI-TOF-MS). Demonstrative examples are given below for these types of operations and analyses. Note that all of the processes described herein are chemical processes, and can be performed in a high-pressure or low-pressure environment. Furthermore, all of these processes can be performed at any scale (including micro- or nano-scale).

A standard means of performing genotyping involves the use of primer extension. An oligonucleotide is annealed which flanks the 5' region of interest on a template (either DNA or RNA). Nucleotides are added in standard proportions, except for one of them being a terminating dideoxynucleotide (ddNTP). An appropriate high-fidelity polymerase is added (i.e. Pfu), and the nucleotides are added on to the template one by one, effectively extending the primer to the point where the ddNTP is incorporated—thus halting the primer extension process. The length of the resultant extension product thus indicates the identity of the base where extension terminated. This extension may only occur for one base, or it may go on until the base complementary to the terminator is encountered. In any event, it is possible to then denature the extended primer from the template, and then size the extended primer to determine an accurate genotype for the template.

In the context of DNA Chromatography, it is possible to use temperature (i.e. >75° C.) or other means to completely denature the extended primer from its corresponding template (Hecker, Karl H. et al, supra,). For example, upon introduction to the pre-heated matrix, the (ion-paired) template and (ion-paired) extended primer will remain adsorbed on the surface until a suitable concentration of organic solvent (acetonitrile, alcohol, etc) is introduced that selectively desorbs only the (significantly shorter) primers and primer extension products, thus leaving the original template behind on the matrix. This is an example where smaller products are purified and collected first, and larger (unnecessary) products are left behind.

It is also possible to analyze these extended products directly on-line by DNA Chromatography. By applying proper chemical conditions for accurate sizing of ssDNA, the extension products are eluted in such a manner as to give information about where the extension process was terminated, and hence indicate the identity of the terminating nucleotide. For example, an 18-mer primer is annealed (underlined) 5' to a variant site (let us say that the variant, in bold, is either a C or a T), and the terminating nucleotide added is ddGTP. The possible variants are shown as examples below.

Variant 1: GTCATCGAATCCATGCTACAC
Variant 2: GTCATCGAATCCATGCTATAC

Once primer extension occurs, the products are either 19 bases long (in the case of a C variant) or are 21 bases long (in the case of a T variant, and extension ceases when the next C nucleotide is encountered).

If the subject is homozygous for Variant 1, then only one peak (for 19 mers) will be detected. If they are homozygous for Variant 2, then only one peak (for 21 mers) will be detected. If they are heterozygous, then two peaks (19-mers and 21-mers) will be detected. In effect, by applying denaturing conditions and proper ssDNA sizing operations, all of these determinations can be performed in a manner that is automated. Furthermore, since DNA Chromatography is a quantitative process, this translates directly to genotyping, such that "allele counting" can occur in a straightforward manner when studying population genetics.

A further presentation of these is presented in TABLE A wherein the (C) represents the single nucleotide polymorphism (SNP) to be detected, (C rather than A)

TABLE A

| | 20 nt primer | | | | |
|---|---|---|---|---|---|
| 1. | ─────── CAGTC ─── template (A) | ddATP dC/dG/dT-TP → | ─── ─── | GTCA CAGTC ─── |
| 2. | ─────── CAGTC (A) | ddCTP dA/dG/dT-TP → | ─── ─── | GTC CAGTC ─── |
| 3. | ─────── CAGTC (A) | ddGTP dA/dC/dT-TP → | ─── ─── | G CAGTC ─── |
| 4. | ─────── CAGTC (A) | ddTTP dA/dC/dG-TP → | ─── ─── | GT CAGTC ─── |

It is also possible to analyze these extension products directly by a suitable "real time" mass spectrometric detection scheme, which will detect these species as they emerge from the DNA Chromatography system. This would be applicable when all of the potential terminating nucleotides are added at one time (ddATP, ddCTP, ddGTP, ddTTP), thus giving mass differences between the eluted extension products. However, this would allow the direct identification of the variant nucleotide in a single step. Using the example above, if the subject were heterozygous (Variant 1 and Variant 2 present), two 19-mer primer extension products would be generated. However, their masses would differ by $(5517_{primer\ mass}+329_{ddGTP\ for\ C\ allele})_{Variant\ 1}-(5517_{primer\ mass}+313_{ddATP\ for\ T\ allele})_{Variant\ 2}=16$ mass units.

Regardless of whether the mass spectrometer is "off-line" (MALDI-TOF) or "on-line" (electrospray), the ability to size the fragments prior to mass spectrometric analysis is of great utility, particularly when trying to perform more than one primer extension at a time (i.e. multiplexing). When a number of primers (and their respective extension products) are to be analyzed by mass spectrometry and a target product requiring determination is a 20-mer, it is theoretically possible to have masses from 18-mers to 22-mers overlapping with the theoretical masses of the 20-mer product. Therefore, separating the primer extension products on the basis of size prior to their analysis by mass spectrometry effects a real-time deconvolution of the data, thus making interpretation more simple.

TABLE B

| # mers (N) | Lowest mass (poly-$C_N$) | Highest mass (poly-$G_N$) |
|---|---|---|
| 18 | 5202 amu | 5922 amu |
| 19 | 5491 | 6251 |
| 20 | 5780 | 6580 |
| 21 | 6069 | 6909 |
| 22 | 6358 | 7238 |

There are instances where a probe is used to interrogate a site within a template (DNA or RNA), and this probing event is monitored by a number of means. This is classically performed by sizing the fragments on a gel, and then probing the resultant separation with a radioactive probe, "Southern" blotting for DNA, and "Northern" blotting for RNA.

There are other probes available which can be analyzed once they are displaced from the original template. As an example, some of these probes carry exogenous "mass tags" which serve to identify the probe once the tag is cleaved off (often by photolysis).

However, to detect this "mass tag" in an efficient manner, the probe to which it is associated must first be released from the template (See PCT applications Nos. WO 9905322, WO 9905321, WO 9905320, WO 9905319, WO 9727327, WO 9727325, WO 9905308, WO 9904896, WO 9727331, the entire contents of all of the above being incorporated by reference). This can be done by a means very similar to that presented above for releasing primer extension products. The amplified products are denatured and probed with the "mass tagged" probes. These duplexes are introduced to the DNA Chromatography matrix under highly denaturing conditions (i.e. >75° C.), so that the probes and corresponding template are separate from one another and retained at the top of the DNA Chromatography matrix. Under suitable sizing conditions for ssDNA, the probes are then selectively eluted from the DNA Chromatography matrix. In this case, instead of conducting the probes directly to a mass spectrometer (as in the case of primer extension products), the "mass tags" are cleaved from the probes and then conducted to the mass spectrometer for detection (and hence detection of the probing event). This can further simplify the detection of "mass tags" by providing another dimension along which selectivity can be provided, i.e., the dimension of probe length.

This invention is further illustrated by the following specific but non-limiting examples where the descriptions of methods in the past tense represent completed laboratory experiments. Descriptions in the present tense have not been carried out in the laboratory and are herein constructively reduced to practice by the filing of this application.

EXAMPLE 1

Size Fractionization of DNA Restriction Fragments with MIPC DNA Fragment Analysis System One application of the WAVE® System is accurate and rapid sizing of DNA fragments. This feature can be exploited for the isolation of DNA fragments. Here we describe the method and buffer gradients used for size fractionation and isolation of restriction fragments generated by digestion of pUC 18 with HaeIII. The nine fragments isolated range in size from 80 to 587 base pairs.

Liquid chromatography (LC) is a powerful technique for the separation of nucleic acids due to its high resolving capability, short analysis time, and ease of recovery of DNA fragments for subsequent studies. The WAVE® System combines the precision of ion-pair reversed-phase LC with automated sampling, data acquisition and reporting functions. Fragments can easily be collected and used in downstream experiments such as subcloning, amplification and sequencing.

TABLE C

Protocol for DNA fragment sizing based on pUC 18/ HaeIII digest analysis at 50° C.

| Time [min] | Buffer A 0.1 M TEAA | Buffer B 0.1 M TEAA, 25% ACN | Flow Rate mL/min |
|---|---|---|---|
| 0.0 | 65 | 35 | 0.75 |
| 3.0 | 45 | 55 | |
| 10.0 | 35 | 65 | |
| 13.0 | 35 | 65 | |
| 14.0 | 0 | 100 | |
| 15.5 | 0 | 100 | |
| 16.5 | 65 | 35 | |

Table D shows fragment sizing of pUC 18 plasmid cut with HaeIII using the protocol in Table C on a 4.6×50 mm column containing octadecylalkyl-substituted styrene-divinylbenzene copolymer beads (DNASep® column, Transgenomic, Inc., Omaha, Nebr.). A total of 9.96 μg of digested DNA was injected in a 20 μl volume. Table D shows amounts of DNA per fragment based on a 9.96 μg injection. Fractions were collected manually.

TABLE D

Amounts of DNA per restriction fragment based on a 9.96 μg total injection.

| Fragment Length base pairs | Percentage of Plasmid Length | Relative Amount DNA μg |
|---|---|---|
| 80 | 3.01 | 0.30 |
| 102 | 3.84 | 0.38 |
| 174 | 6.55 | 0.65 |
| 257 | 9.67 | 0.96 |
| 267 | 10.05 | 1.00 |
| 298 | 11.22 | 1.12 |
| 434 | 16.33 | 1.63 |

TABLE D-continued

Amounts of DNA per restriction fragment based on a 9.96 μg total injection.

| Fragment Length base pairs | Percentage of Plasmid Length | Relative Amount DNA μg |
|---|---|---|
| 458 | 17.24 | 1.72 |
| 587 | 22.09 | 2.20 |

Peaks corresponding to the 80, 102, 174, 298 and 587 bp fragments were collected in 200 μl volumes. The 257/267 fragments, which differ only by 10 bp, elute within less than 20 seconds of each other so do the 434/458 bp fragments. In order to achieve separation of these peaks the fraction size was lowered to 100 μl. After collection fractions were dried down and resuspended in 30 μl TE buffer (10 mM Tris, 1 mM EDTA) of which 25 μl were re-injected for analysis using the protocol in Table C. Fragment sizes and corresponding retention times are listed in Table E.

TABLE E

Restriction fragment retention time comparison between an injection of complete digest and purified individual restriction fragments.

| Fragment Length, base pairs | Retention Time min, Complete Digest | Retention Time min, Individual Fragments |
|---|---|---|
| 80 | 4.75 | 4.76 |
| 102 | 5.30 | 5.32 |
| 174 | 6.71 | 6.77 |
| 257 | 8.54 | 8.69 |
| 267 | 8.81 | 8.92 |
| 298 | 9.46 | 9.60 |
| 434 | 11.48 | 11.69 |
| 458 | 11.80 | 12.01 |
| 587 | 12.89 | 13.11 |

The results obtained are shown in FIGS. 12 to 21 wherein the figure number and the base pair length are shown in Table F.

TABLE F

| Fragment Length, base pairs | FIG. No. |
|---|---|
| 80 | 13 |
| 102 | 14 |
| 174 | 15 |
| 257 | 16 |
| 267 | 17 |
| 298 | 18 |
| 434 | 19 |
| 458 | 20 |
| 587 | 21 |

DNA fragments ranging in size from 80 to 587 bp were separated and recovered as shown in FIGS. 12–21. The 80, 102, 174, 257, 298, 434, and 587 bp DNA fragments were fully purified, without contamination by any other fragment of the restriction digest. Only the isolation of the 267 bp fragment and 458 bp fragment, which are preceded by fragments in the digest of 257 and 434 bp, respectively, showed minor contamination with the corresponding shorter fragment.

EXAMPLE 2

Preparation of Spin Column

A 50 mg portion of resin is added to each spin column (See schematic representation of column in FIG. 7) while pulling a vacuum on the columns. The sides of the columns were tapped to remove resin from the walls. A polyethylene filter was placed on the top of the resin in each vial, followed by a retaining ring, with gentle tapping with a hammer to position the retaining ring securely against the filter. The spin columns were washed with an aqueous solution containing 50% acetonitrile (ACN) and 0.1 M triethylammonium acetate (TEAA). The vials were then washed with an aqueous solution of 25% ACN and 0.1 M TEAA and then with an aqueous solution of 0.1 M TEAA.

EXAMPLE 3

Separation of PUC 18 Msp I with Spin Column

Figure 22:
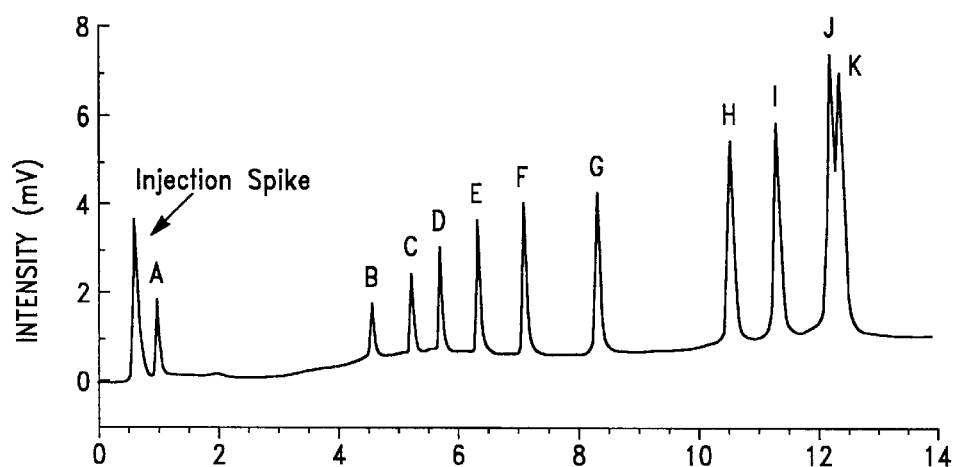
FIG. 22 is a chromatogram of the separated 587 bp fragment obtained in the procedure of Example 1.

A sample solution was prepared by diluting 35 ml stock pUC 18 Msp I to 1 ml with 0.1 M TEAA (1 ml total volume). A 400 ml aliquot (corresponding to 6.6 mg loaded on the column) was selected. Base pair length separation of the solution was performed using the WAVE separation system (Transgenomic, Inc., Omaha, Nebr.) described in FIGS. 1–3, and the chromatograms obtained for two of the columns are shown in FIG. 22 for the pUC 18 Msp I standard.

Figure 23:
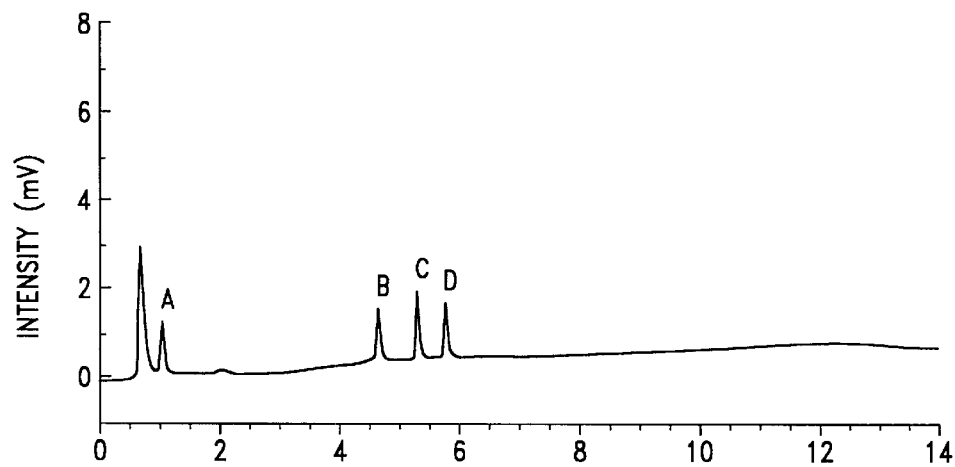
FIG. 23 is a chromatogram of the low molecular weight and small base-pair length fraction eluant obtained in Example 3.

An aliquot of the sample solution was pipetted into separate spin columns and left standing for 5 min. Each vial was centrifuged at 5000 rpm for 5 min. Then 400 μl of freshly prepared aqueous solution containing 9.5% ACN and 0.1 M TEAA was pipetted into each spin column, each vial was left standing for 5 min, each vial was centrifuged at 5000 rpm for 5 min, and the filtrate was analyzed using the WAVE separation system. The chromatogram obtained for the eluant is shown in FIG. 23 for the pUC 18 Msp I standard. The treatment procedure was repeated.

Figure 24:
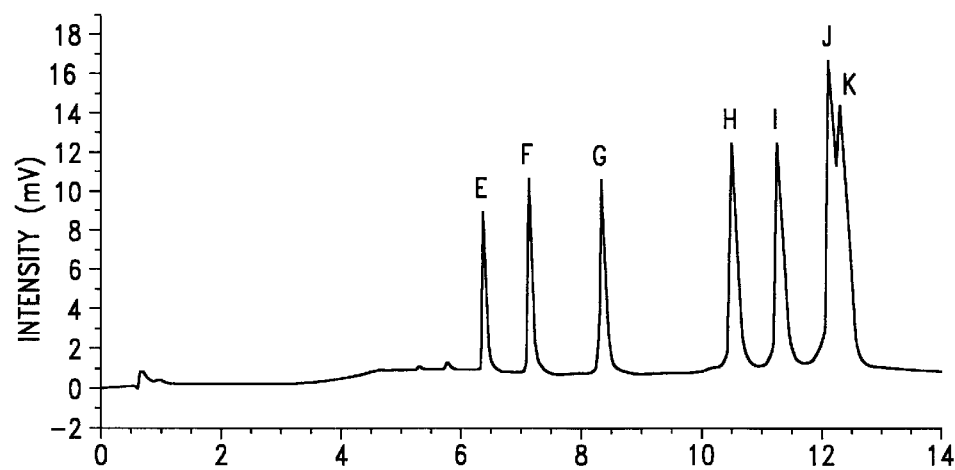
FIG. 24 is a chromatogram of the high base-pair length fraction eluant obtained in Example 3, demonstrating the efficacy of the spin column device for purifying high base-pair length components of a mixture of DNA fragments.

The above procedure was repeated, replacing the 38% B solution with 100 μl of a 100% B solution. The chromatogram by analyzing the eluant with the WAVE separation system is shown in FIG. 24 for the pUC 18 Msp I standard.

This example demonstrates the removal of smaller size fragments from the column while retaining the larger-sized fragments on the column, and subsequent removal of the larger-sized fragments from the column. This is particularly useful for purifying a larger-sized fragment or fragments from smaller size contaminants.

EXAMPLE 4

Separation of pBR322HAE III with Spin Column

Figure 25:
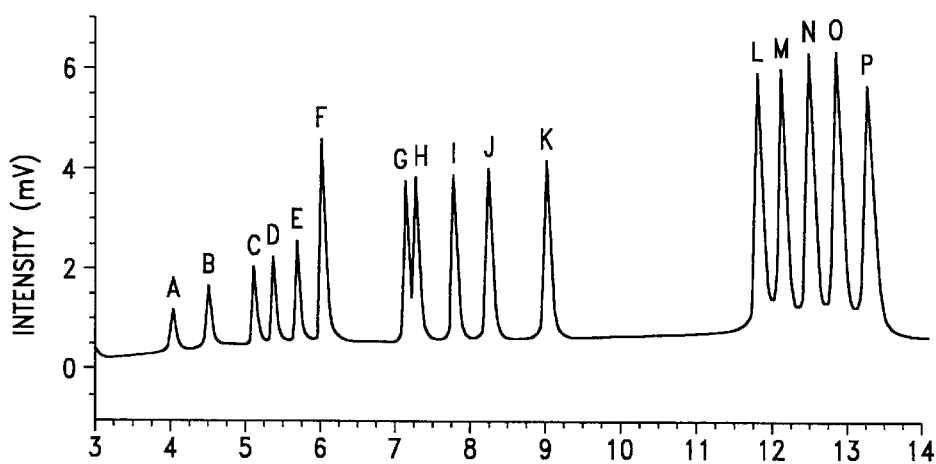
FIG. 25 is a chromatogram of a pBR322 standard mixture of dsDNA fragments used in Example 4.

A sample solution was prepared by diluting 18 ml stock pbr322 HAE III digest to 1 ml with 0.1 M TEAA (1 ml total volume). A 400 ml aliquot (corresponding to 6.6 mg loaded on column) was selected. Base pair length separation of the solution was performed using the WAVE separation system (Transgenomic, Inc., Omaha, Nebr.) described in FIGS. 1–3, and the chromatograms obtained for two of the columns are shown in FIG. 25 for the pBR322HAE III standard.

Figure 26:
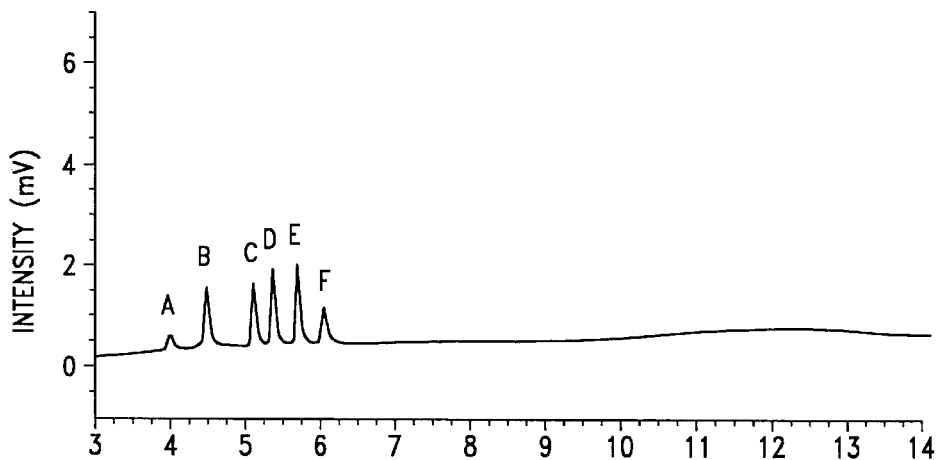
FIG. 26 is a chromatogram of the low molecular weight and small basepair length fraction eluant obtained in Example 4.

An aliquot of the sample solution was pipetted into separate spin columns and left standing for 5 min. Each vial was centrifuged at 5000 rpm for 5 min. Then 400 μl of freshly prepared aqueous solution containing 38% B (B is an aqueous 25% ACN solution, 0.1 M TEAA) was pipetted into each spin column, each vial was left standing for 5 min, each vial was centrifuged at 5000 rpm for 5 min, and the filtrate was analyzed using the WAVE separation system. The chromatogram obtained for the eluant is shown in FIG. 26 for the pBR322HAE III standard. The treatment procedure was repeated.

Figure 27:
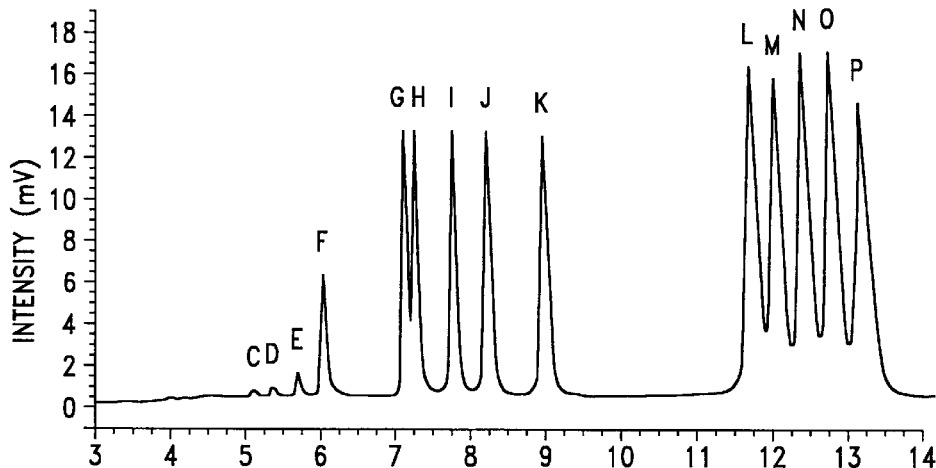
FIG. 27 is a chromatogram of the high base-pair length fraction eluant obtained in Example 4.

The above procedure was repeated, replacing the 38% B solution with 100 μl of a 100% B solution. The chromatogram by analysis with the eluant with the WAVE separation system is shown in FIG. 27 for the pBR322HAE III standard.

This example demonstrates the removal of smaller size fragments from the column while retaining the larger-sized fragments on the column, and subsequent removal of the larger-sized fragments from the column. This is particularly useful for purifying a larger-sized fragment or fragments from smaller size contaminants.

EXAMPLE 5

Purification of PCR product with Spin Column

Figure 28:
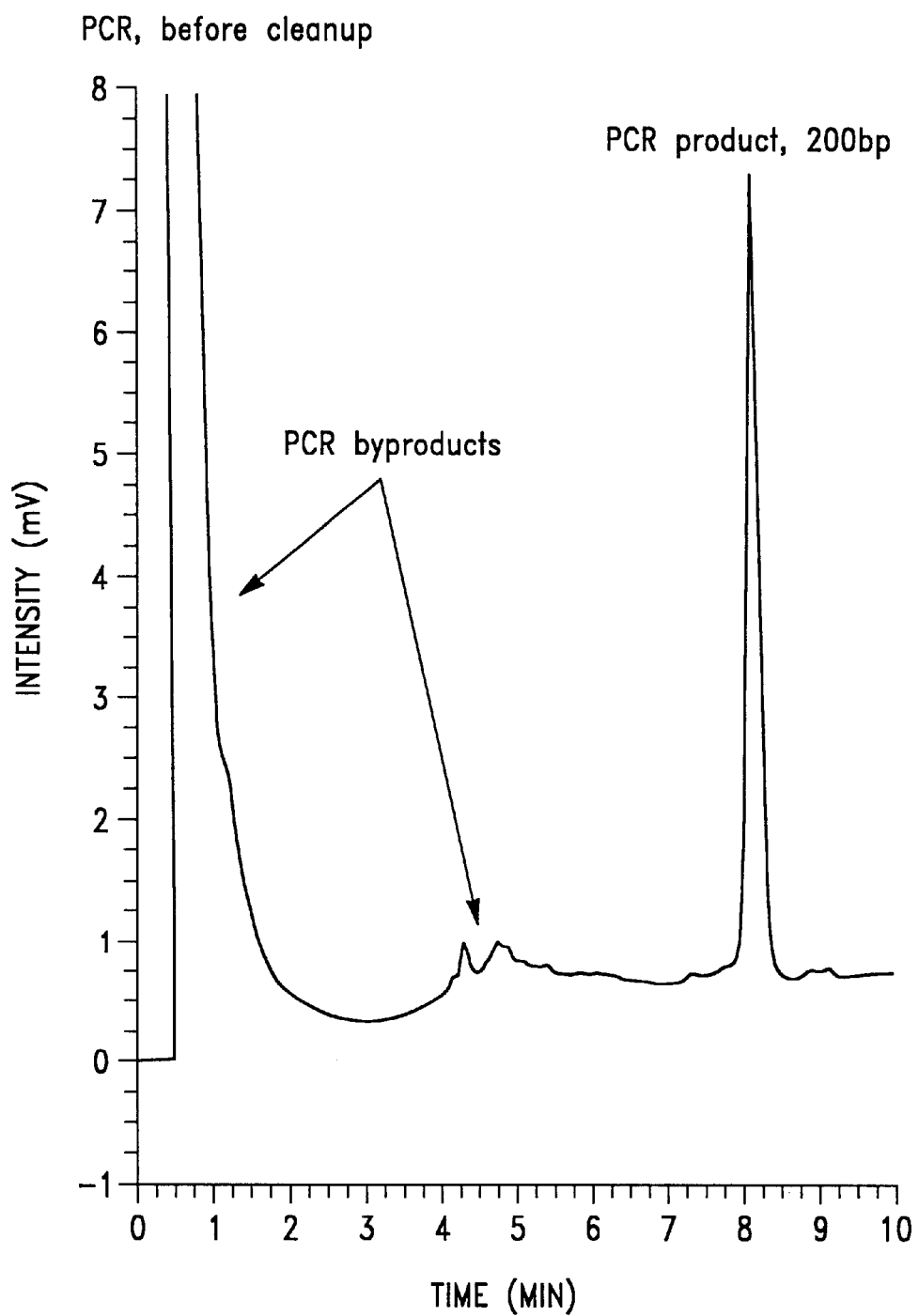
FIG. 28 is a chromatogram obtained in the procedure of Example 5.

A sample solution was prepared by pipetting 100 μl 0.2 M TEAA onto the spin column and pipefting 100 μl of a 200 bp fragment (p53 exon 6 genomic DNA) which had been amplified by PCR. Separation of the solution was performed using the WAVE separation system (Transgenomic, Inc., Omaha, Nebr.) described in FIGS. 1–3, and shown in FIG. 28.

An aliquot of the sample solution was pipetted into separate spin columns and left standing for 2 min. Each vial was centrifuged at 5000 rpm for 5 min. Then 400 μl of freshly prepared aqueous solution containing 38% B (B is an aqueous 25% ACN solution, 0.1 M TEAA) was pipetted into each spin column, each vial was left standing for 2 min, each vial was centrifuged at 5000 rpm for 5 min, and the filtrate was analyzed using the WAVE separation system. The treatment procedure was repeated.

Figure 29:
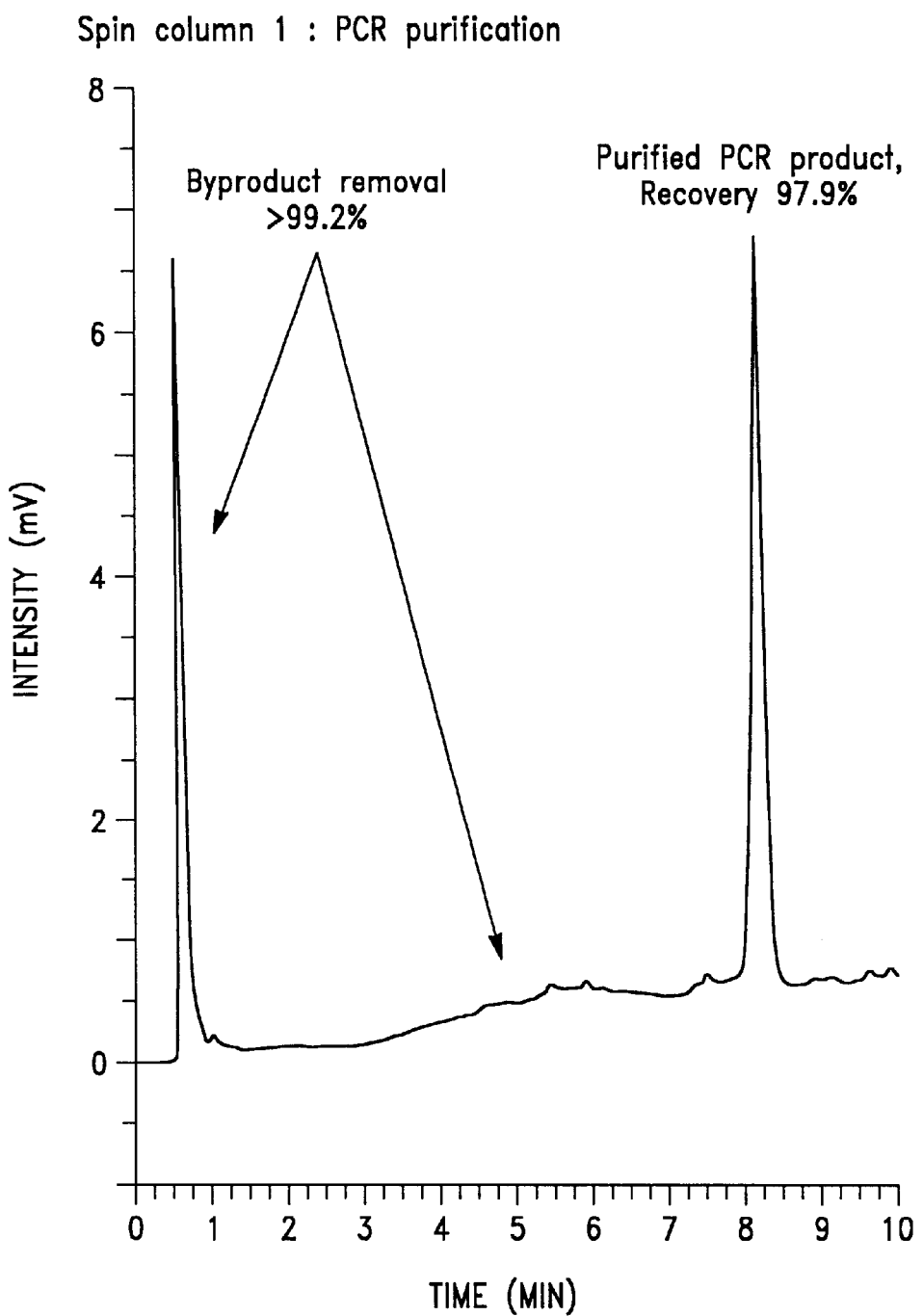
FIG. 29 is a chromatogram obtained in the procedure of Example 5.

The above procedure was repeated, replacing the 38% B solution with 100 μl of a 100% B solution. The chromatogram by analyzing the eluant with the WAVE separation system is shown in FIG. 29 for the 200 bp fragment. FIG. 29 shows a purified PCR product recovery of 97.9% and a byproduct removal of greater than 99.2%

This example demonstrates the ability of this procedure to elute PCR product with a high recovery and almost complete removal of PCR byproducts.

EXAMPLE 6

Separation of a Labeled Oligonucleotide of the Same Length by MIPC

Figure 30:
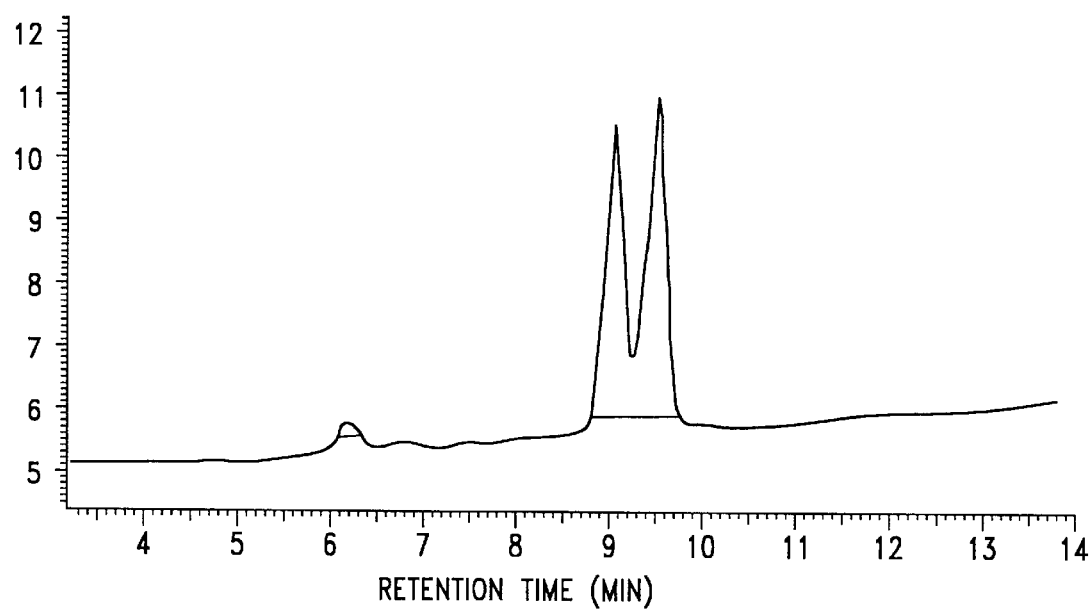
FIG. 30 is a chromatogram obtained in the procedure of Example 6.

A 200 bp fragment (from plitmus) using one biotinylated primer was injected onto an MIPC column and was eluted under gradient conditions to produce a chromatogram as shown in FIG. 30. Separation was performed using the WAVE separation system (Transgenomic, Inc., Omaha, Nebr.) described in FIGS. 1–3. The mobile phase comprised component A, 0.1 M triethylammonium acetate (TEAA) and component B, 0.1 M TEAA, 25% acetonitrile. A linear gradient was used in the separation starting at 30% component B and extended to 70% component B in 12 minutes at 75° C. The column was a DNASep® (Transgenomic, Inc. San Jose, Calif.).

In FIG. 30, the biotinylated oligonucleotide is eluted later than the non-biotinylated oligonucleotide. The higher retention time is due to the hydrophobicity of the biotin moeity.

Thus, under denaturing conditions, the 200 nucleotide ssDNA species can be separated from the biotinylated ssDNA species of the same length.

EXAMPLE 7

Kinetic Separation of Homoduplexes and Heteroduplexes by MIPC

Figure 31:
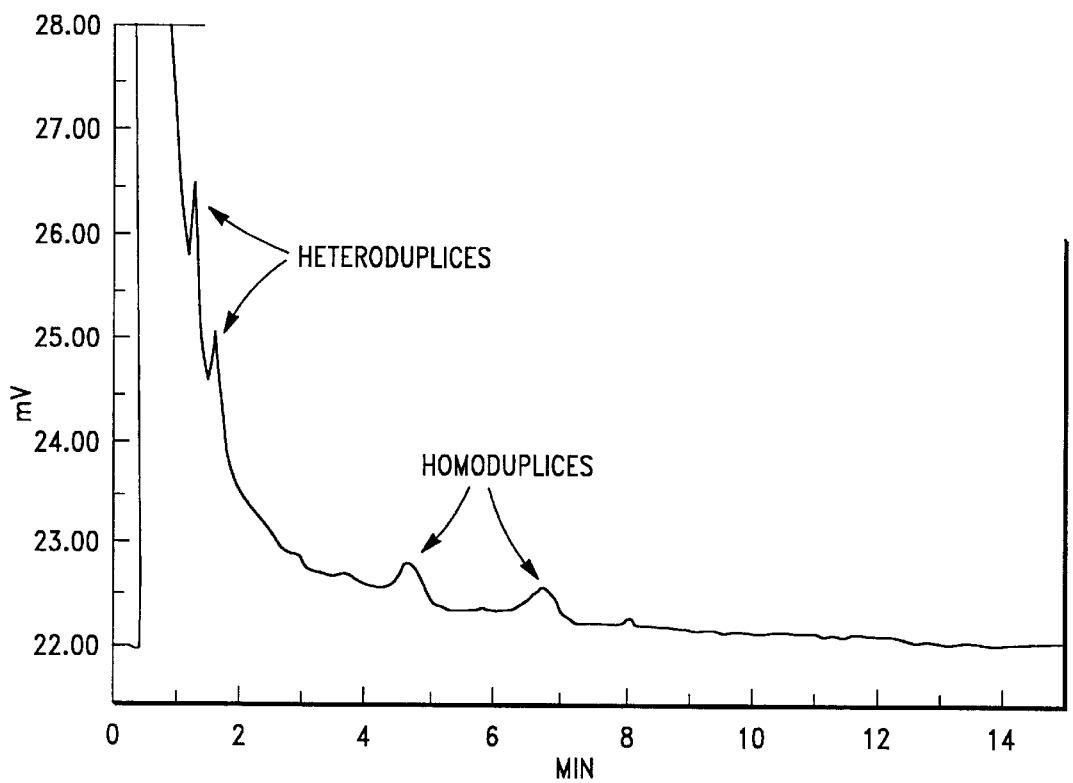
FIG. 31 is a chromatogram of the separated hybridized dsDNA mixture obtained by elution with an isocratic mobile phase.

A 209 bp fragment from human Y chromosome, locus DYS271 with an A to G mutation at position 168 is chromatographed by MIPC and the result is substantially similar to that seen in FIG. 31.

MIPC analysis conditions using the WAVE® DNA Fragment Analysis System, are as follows: Component A: 0.1 M TEAA, Component B: 0.1 M TEAA, 25% Acetonitrile; flow rate: 0.9 mL/min; temperature: 56° C.; detection: UV, 254 nM. The gradient used is as follows:

| TIME, min. | % A | % B |
|---|---|---|
| 0.0 | 46 | 54 |
| 0.5 | 45 | 55 |
| 4.0 | 38 | 62 |
| 4.1 | 0 | 100 |
| 4.5 | 0 | 100 |
| 4.6 | 46 | 54 |
| 5.0 | 46 | 54 |

The heteroduplexes would elute before the homoduplexes.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for isolating targeted DNA fragments having a predetermined base-pair length from a mixture of DNA fragments, the method comprising:

a) applying the mixture of DNA fragments to a separation column containing separation media having a nonpolar, nonporous surface, the mixture of DNA fragments being in a first solution containing counterion and a DNA binding concentration of driving solvent, wherein said surface is substantially free of multivalent cations capable of binding DNA; and b) removing the targeted DNA fragments from the media by contacting the media with a second solution containing counterion and a concentration of driving solvent which has been predetermined to remove DNA fragments having the targeted fragments from the separation media into a distinct segment of eluant.

2. A method of claim 1 including the step of:

c) collecting the distinct segment of eluant, whereby the targeted DNA fragments are recovered.

3. A method of claim 2 wherein the recovered targeted DNA fragments are amplified.

4. A method of claim 2 wherein the recovered targeted DNA fragments are cloned.

5. A method for determining the presence of DNA fragments having a specific base-pair length in a sample mixture, the method comprising:

a) applying the sample mixture to a separation column containing separation media having a nonpolar, nonporous surface, the sample mixture being in a first solvent mixture containing a counterion and a DNA binding concentration of driving solvent in a cosolvent, wherein said surface is substantially free of multivalent cations capable of binding DNA; and b) removing any DNA in the sample having said specific base pair length by contacting the separating media with a second solvent solution containing a counterion and a concentration of driving solvent which has been predetermined to remove DNA fragments having said base pair from the separation media.

6. A method of claim 5 wherein the second solvent solution produced in step (b) is collected.

7. A method of claim 6 wherein the second solvent solution product of step (b) is analyzed to determine whether or not DNA fragments having said base pair length are present in the sample mixture.

8. A method of claim 7 wherein any DNA in the second solvent solution product of step (b) is amplified.

9. A method of claim 8 wherein DNA fragments having said base pair length are present in the sample mixture in a concentration which is too low to be detected in the analysis, and the amplified product is analyzed to verify the presence of DNA fragments having said base pair length in the sample mixture.

10. A method for separating, by Denaturing Matched Ion Polynucleotide Chromatography, target homoduplex and/or heteroduplex DNA fragments from a mixture of homoduplex and heteroduplex DNA fragments having the same base-pair length, the heteroduplex fragments having at least one mismatch site, the method comprising the steps of:

a) applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent, wherein said surface is substantially free of multivalent cations capable of binding DNA; and b) while maintaining the media and the solution at a temperature which will locally denature the heteroduplex fragments at the mismatch site of the heteroduplex fragments, separating desired homoduplex and/or heteroduplex DNA fragments from the separation media by contacting the separation media with a second solution containing a counterion and a concentration of driving solvent which has been predetermined to separate the target homoduplex and/or heteroduplex DNA fragments from the separation media in separate fractions.

11. A method of claim 10 wherein the desired fragments are a homoduplex fraction, the concentration of driving solvent is selected to remove one or both of the homoduplex fractions as separate fractions from homoduplex fractions.

12. A method of claim 11 including the step of collecting a homoduplex fraction.

13. A method of claim 12 including amplifying the collected homoduplex fraction.

14. A method of claim 10 wherein the desired fragments are a heteroduplex fraction, the concentration of driving solvent is selected to remove one or both of the heteroduplex fractions as separate fractions from homoduplex fractions.

15. A method of claim 11 including the step of collecting a heteroduplex fraction.

16. A method of claim 12 including amplifying the collected heteroduplex fraction.

17. A method of claim 10 wherein the ratio of the amounts of the heteroduplex fragments to homoduplex fragments is less than 1:1.

18. A method of claim 17 wherein the amount of heteroduplex in the separate heteroduplex fraction is below the level of detection.

19. A method of claim 10 wherein the concentration of driving solvent in the second solution was previously determined from a reference standard.

20. A method of claim 19 wherein the reference standard was obtained by separating a standard mixture of homoduplex and heteroduplex, having the same base pair sequence as the sample, by Matched Ion Polynucleotide Chromatography.

21. A method for determining the presence of a homoduplex or a heteroduplex fraction in a mixture of homoduplex and heteroduplex DNA fragments having the same base-pair length, the heteroduplex fragments having at least one mismatch site, the method comprising the steps of:

a) applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent, wherein said surface is substantially free of multivalent cations capable of binding DNA; and b) while maintaining the media and the solution at a temperature which will locally denature the heteroduplex fragments at the mismatch site of the heteroduplex fragments, separating desired homoduplex and/or heteroduplex DNA fragments from the separation media by contacting the separation media with a second solution containing a counterion and a concentration of driving solvent which has been predetermined to separate the target homoduplex and/or heteroduplex DNA fragments from the separation media in separate fractions.

22. A method of claim 21 including the step of:

c) collecting the distinct segment of eluant, whereby the targeted DNA fragments are recovered.

23. A method of claim 22 wherein the recovered targeted DNA fragments are amplified.

24. A method of claim 22 wherein the recovered targeted DNA fragments are cloned.

25. A method of claim 22 wherein said DNA sample contains a large background of wild type homoduplex DNA.

26. A method of claim 22 wherein said mutant DNA is below the limit of detection.

27. A method of claim 22 wherein the DNA sequences of the wild type DNA and the mutant DNA are known.

28. A method of claim 21 wherein the mutant DNA differs from wild type DNA by at least one base pair.

29. A method of claim 21 wherein the retention time used in the separation of the homoduplex or heteroduplex fraction was previously determined from a reference standard.

30. A method of claim 29 wherein the reference standard was obtained by separating a standard mixture of homoduplex and heteroduplex, having the same base pair sequence as the sample, by Matched Ion Polynucleotide Chromatography.

31. A method of claim 1 wherein said medium has been subjected to acid wash treatment to remove any residual surface metal contaminants.

32. A method of claim 1 wherein said medium has been subjected to treatment with multivalent cation binding agent.

33. A method for isolating DNA fragments in a mixture, the method comprising:

a) applying the mixture of DNA fragments to a separation column containing separation media having a nonpolar, nonporous surface, the mixture of DNA fragments being in a first solution containing counterion and lacking driving solvent, wherein said surface is substantially free of multivalent cations capable of binding DNA; and b) removing the DNA fragments from the media by contacting the media with a second solution containing counterion and a concentration of driving solvent comprising acetonitile at a fixed concentration of at least about 25%.

34. A method of claim 33 wherein said fixed concentration is greater that about 50%.

35. A method of claim 33 herein said media comprises silica.

36. A method of claim 33 wherein the fragments removed in step (b) are analyzed by mass spectral analysis.

37. A method for determining the presence of a homoduplex or a heteroduplex fraction in a mixture of homoduplex and heteroduplex DNA fragments having the same base-pair length, the heteroduplex fragments having at least one mismatch site, the method comprising the steps of:

a) applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent, wherein said surface is substantially free of multivalent cations capable of binding DNA; and b) while maintaining the media and the solution at a temperature which will locally denature the heteroduplex fragments at the mismatch site of the heteroduplex fragments, separating desired homoduplex and/or heteroduplex DNA fragments from the separation media by contacting the separation media with a second solution containing a counterion and a concentration of driving solvent which has been predetermined to separate the target homoduplex and/or heteroduplex DNA fragments from the separation media in separate fractions.

38. A method for separating, by Denaturing Matched Ion Polynucleotide Chromatography, target homoduplex and/or heteroduplex DNA fragments from a mixture of homoduplex and heteroduplex DNA fragments having the same base-pair length, the heteroduplex fragments having at least one mismatch site, the method comprising the steps of:

a) applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent, wherein said surface is substantially free of multivalent cations capable of binding DNA; and b) while maintaining the media and the solution at a temperature which will locally denature the heteroduplex fragments at the mismatch site of the heteroduplex fragments, separating desired homoduplex and/or heteroduplex DNA fragments from the separation media by contacting the separation media with a second solution containing a counterion and a concentration of driving solvent which has been predetermined to separate the target homoduplex and/or heteroduplex DNA fragments from the separation media in separate fractions.

39. A method for determining the presence of a homoduplex or a heteroduplex fraction in a mixture of homoduplex and heteroduplex DNA fragments having the same base-pair length, the heteroduplex fragments having at least one mismatch site, the method comprising the steps of:

a) applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent, wherein said surface is substantially free of multivalent cations capable of binding DNA; and b) while maintaining the media and the solution at a temperature which will locally denature the heteroduplex fragments at the mismatch site of the heteroduplex fragments, separating desired homoduplex and/or heteroduplex DNA fragments from the separation media by contacting the separation media with a second solution containing a counterion and a concentration of driving solvent which has been predetermined to separate the target homoduplex and/or heteroduplex DNA fragments from the separation media in separate fractions, wherein the concentration of driving solvent in the second solution was previously determined from a reference standard.

40. A method for separating, by Denaturing Matched Ion Polynucleotide Chromatography, target homoduplex and/or heteroduplex DNA fragments from a mixture of homoduplex and heteroduplex DNA fragments having the same base-pair length, the heteroduplex fragments having at least one mismatch site, the method comprising the steps of:

a) applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent, wherein said surface is substantially free of multivalent cations capable of binding DNA; and b) while maintaining the media and the solution at a temperature which will locally denature the heteroduplex fragments at the mismatch site thereof, separating desired homoduplex and/or heteroduplex DNA fragments from the separation media by contacting the separation media with a second solution containing a counterion and a concentration of driving solvent which has been predetermined to separate the target homoduplex and/or heteroduplex DNA fragments from the separation media in separate fractions, wherein the concentration of driving solvent in the second solution was previously determined from a reference standard.

41. A method for isolating targeted DNA fragments having a predetermined base-pair length from a mixture of DNA fragments, the method comprising:

a) applying the mixture of DNA fragments to a separation column containing separation media having a nonpolar, nonporous surface, the mixture of DNA fragments being in a first solution containing counterion and a DNA binding concentration of driving solvent, wherein said surface is substantially free of multivalent cations capable of binding DNA; and b) removing the targeted DNA fragments from the media by contacting the media with a second solution containing counterion and a concentration of driving solvent which has been predetermined to remove DNA fragments having the targeted fragments from the separation media into a distinct segment of eluant.

42. A method of claim 41 wherein said medium has been subjected to acid wash treatment to remove any residual surface metal contaminants.

43. A method of claim 41 wherein said medium has been subjected to treatment with multivalent cation binding agent.

44. A method for isolating DNA fragments in a mixture, the method comprising:
   a) applying the mixture of DNA fragments to a separation column containing separation media having a nonpolar, nonporous surface, the mixture of DNA fragments being in a first solution containing counterion and lacking driving solvent, wherein said media comprises silica, and wherein said surface is substantially free of multivalent cations capable of binding DNA; and
   b) removing the DNA fragments from the media by contacting the media with a second solution containing counterion and a concentration of driving solvent comprising acetonitile at a fixed concentration of at least about 50%.

45. A method of claim 44 wherein step (b) includes contacting the media with said second solution under ambient or low pressure.

46. A method for isolating targeted DNA fragments having a predetermined base-pair length from a mixture of DNA fragments, the method comprising:
   a) applying the mixture of DNA fragments to a separation column containing separation media having a nonpolar, nonporous surface, the mixture of DNA fragments being in a first solution containing counterion and a DNA binding concentration of driving solvent, wherein said surface is substantially free of multivalent cations capable of binding DNA; and
   b) removing the targeted DNA fragments from the media by contacting the media, under ambient or low pressure, with a second solution containing counterion and a concentration of driving solvent which has been predetermined to remove DNA fragments having the targeted fragments from the separation media into a distinct segment of eluant.

47. A method for determining the presence of DNA fragments having a specific base-pair length in a sample mixture, the method comprising:
   a) applying the sample mixture to a separation column containing separation media having a nonpolar, nonporous surface, the sample mixture being in a first solvent mixture containing a counterion and a DNA binding concentration of driving solvent in a cosolvent, wherein said surface is substantially free of multivalent cations capable of binding DNA; and
   b) removing any DNA in the sample having said specific base pair length by contacting, under ambient or low pressure, the separating media with a second solvent solution containing a counterion and a concentration of driving solvent which has been predetermined to remove DNA fragments having said base pair from the separation media.

48. A method for separating target homoduplex and/or heteroduplex DNA fragments from a mixture of homoduplex and heteroduplex DNA fragments having the same base-pair length, the heteroduplex fragments having at least one mismatch site, the method comprising the steps of:
   a) applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent, wherein said surface is substantially free of multivalent cations capable of binding DNA; and
   b) while maintaining the media and the solution at a temperature which will locally denature the heteroduplex fragments at the mismatch site of the heteroduplex fragments, separating desired homoduplex and/or heteroduplex DNA fragments from the separation media by contacting, under ambient or low pressure, the separation media with a second solution containing a counterion and a concentration of driving solvent which has been predetermined to separate the target homoduplex and/or heteroduplex DNA fragments from the separation media in separate fractions.

49. A method for determining the presence of a homoduplex or a heteroduplex fraction in a mixture of homoduplex and heteroduplex DNA fragments having the same base-pair length, the heteroduplex fragments having at least one mismatch site, the method comprising the steps of:
   a) applying the mixture of homoduplex and heteroduplex DNA fragments to a separation column containing separation media having a nonpolar, nonporous surface, the mixture of homoduplex and heteroduplex DNA fragments being applied in a first solution containing a counterion and a DNA binding concentration of driving solvent, wherein said surface is substantially free of multivalent cations capable of binding DNA; and
   b) while maintaining the media and the solution at a temperature which will locally denature the heteroduplex fragments at the mismatch site of the heteroduplex fragments, separating desired homoduplex and/or heteroduplex DNA fragments from the separation media by contacting, under ambient or low pressure, the separation media with a second solution containing a counterion and a concentration of driving solvent which has been predetermined to separate the target homoduplex and/or heteroduplex DNA fragments from the separation media in separate fractions.

* * * * *